United States Patent [19]

Pezzolo et al.

[11] Patent Number: 4,755,792
[45] Date of Patent: Jul. 5, 1988

[54] SECURITY CONTROL SYSTEM

[75] Inventors: Donald E. Pezzolo, Los Altos Hills; Blazo A. Mitasev, San Jose, both of Calif.

[73] Assignee: Black & Decker Inc., Newark, Del.

[21] Appl. No.: 89,029

[22] Filed: Aug. 24, 1987

Related U.S. Application Data

[63] Continuation of Ser. No. 744,796, Jun. 13, 1985, abandoned.

[51] Int. Cl.[4] .......................... G08B 1/08; H04Q 1/30

[52] U.S. Cl. .................................... 340/538; 340/539; 340/527; 340/531; 340/506; 340/534; 340/310 R; 340/310 CP; 340/309.15; 340/825.06

[58] Field of Search ............... 340/538, 539, 500, 506, 340/531, 533, 534, 541, 310 R, 310 A, 310 CP, 309.15, 527, 825.06, 528, 825.71; 367/199

[56] References Cited

U.S. PATENT DOCUMENTS 2,567,908 9/1951 Levy .
2,731,622 1/1956 Doremus et al. .
2,731,635 1/1956 Walker .
2,860,324 11/1958 Berger et al. .
2,861,257 11/1958 Weintraub .
2,905,762 9/1959 Rettie et al. .
3,011,102 11/1961 Balan .
3,211,111 10/1965 Morley .
3,274,578 9/1966 Block et al. .
3,320,576 5/1967 Dixon et al. .
3,334,340 8/1967 McConnell .
3,357,009 12/1967 Rusnak et al. .
3,359,551 12/1967 Dennison .
3,378,829 4/1968 Alafi et al. .
3,388,389 6/1968 Henriques .
3,408,642 10/1968 Palladino .
3,461,428 8/1969 Anderson .
3,462,756 8/1969 Mills .
3,465,294 9/1969 Carsello et al. .
3,484,771 12/1969 Falck, Jr. .
3,488,517 1/1970 Cowan et al. .
3,517,216 6/1970 Cope .
3,522,544 8/1970 Saldutti et al. .
3,524,179 8/1970 Morgenson et al. .
3,525,078 8/1970 Baggott .
3,555,435 1/1971 Vosteen .
3,558,917 1/1971 Crouse .
3,573,642 4/1971 Yackish .
3,581,283 5/1971 Reddel et al. .

(List continued on next page.)

*Primary Examiner*—Donnie L. Crosland
*Attorney, Agent, or Firm*—Harness, Dickey & Pierce

[57] ABSTRACT

A security and control system for use in a home or building which utilizes a coded audio link between the entry detectors/transmitters and the relay modules, and a digital pulse coded power line communication ("PLC") link between the relay modules and the system controller as well as between the system controller and the various remotely located slave units which control the energization of lamps, appliances, and alarms. The relay modules and controller include constant false alarm rate ("CFAR") receivers for isolating the coded audio signal from background noise and unique exclusion circuitry for decoding the isolated signal. The PLC messages are generated by impressing a pulse code modulated high frequency carrier signal onto the AC line at selected points in the AC waveform. The location of each carrier frequency pulse relative to the 60 Hz AC line cycle determines the digital value of the pulse. Both before and during a PLC message transmission, the controller and relay modules are adapted to check the status of the AC power line for the presence of intelligence or excessive noise levels and delay transmission if either condition is detected. In the security mode, the system has three major states: INSTANT-ARM, ARM-DELAY, and DISARM. In the INSTANT-ARM state, the system responds immediately to the detection of an intrusion event. In the ARM-DELAY state, a 40-second delay is implemented before alarm action is taken to permit an authorized entrant to DISARM the system. Significantly, the 40-second delay is implemented by each of the remotely located slave modules so that destruction of the controller by an intruder within the 40-second period will not defeat the system.

36 Claims, 9 Drawing Sheets

U.S. PATENT DOCUMENTS 3,594,584 7/1971 Woods .
3,597,690 8/1971 Wycoff .
3,605,082 9/1971 Matthews .
3,623,088 11/1971 Peterson .
3,631,433 12/1971 Dix .
3,659,266 4/1972 Meyerle .
3,659,289 4/1972 Everitt .
3,686,635 8/1972 Millington et al. .
3,696,383 10/1972 Oishi et al. .
3,757,301 9/1973 Regan et al. .
3,772,667 11/1973 Falck, Jr. .
3,825,897 7/1974 Lawton .
3,833,895 9/1974 Fecteau .
3,852,740 12/1974 Haymes .
3,886,534 5/1975 Rosen et al. .
3,909,722 9/1975 Bennett, Jr. .
3,922,664 11/1975 Wadsworth .
3,925,763 12/1975 Wadhwani et al. .
3,944,934 3/1976 Francis, Jr. .
4,013,959 3/1977 Patterson .
4,024,528 5/1977 Boggs, et al. .
4,039,959 8/1977 Pattantyus-Abraham .
4,056,815 11/1977 Anderson .
4,072,931 2/1978 Davis .
4,091,361 5/1978 Eichelberger et al. .
4,092,643 5/1978 Stolarczyk .......................... 340/539
4,106,007 8/1978 Johnston et al. .
4,109,239 8/1978 Davis .
4,117,462 9/1978 Miller .
4,131,881 12/1978 Robinson .
4,162,486 7/1979 Wyler .
4,163,218 7/1979 Wu .
4,166,273 8/1979 Riley, Jr. et al. .
4,173,754 11/1979 Feiker .
4,174,517 11/1979 Mandel .
4,185,272 1/1980 Feiker .
4,188,621 2/1980 Heckelman et al. .
4,189,713 2/1980 Duffy .
4,190,790 2/1980 Plumb et al. .
4,200,862 4/1980 Campbell et al. .
4,206,450 6/1980 Harden et al. .
4,207,474 6/1980 Townsend .
4,207,559 6/1980 Meyer .
4,211,938 7/1980 Bolgiano et al. .
4,218,655 8/1980 Johnston et al. .
4,227,188 10/1980 Petersen .
4,229,681 10/1980 Plumb .
4,232,294 11/1980 Burke et al. .
4,232,308 11/1980 Lee et al. .
4,249,093 2/1981 Henig .
4,290,056 9/1981 Chow .
4,319,222 3/1982 Davis et al. .
4,321,592 3/1982 Crandall et al. .
4,328,482 5/1982 Belcher et al. .
4,335,381 6/1982 Palmer .
4,337,465 6/1982 Spracklen et al. .
4,340,880 7/1982 Baumann et al. .
4,349,820 9/1982 Iwata .
4,352,992 10/1982 Buennagel et al. .
4,357,605 11/1982 Clements .
4,358,756 11/1982 Morel et al. .
4,361,766 11/1982 de Montgolfier et al. .
4,367,455 1/1983 Fried .
4,367,458 1/1983 Hackett .
4,377,754 3/1983 Thompson .
4,377,804 3/1983 Suzuki .
4,400,688 8/1983 Johnston et al. .
4,408,186 10/1983 Howell .
4,409,592 10/1983 Hunt .
4,410,883 10/1983 Swiston, Sr. .
4,414,534 11/1983 Whidden .
4,417,235 11/1983 Del Grande .
4,418,333 11/1983 Schwarzbach et al. .
4,429,299 1/1984 Kabat et al. .
4,446,454 5/1984 Pyle .
4,446,458 5/1984 Cook .
4,450,436 5/1984 Massa .
4,454,509 6/1984 Buennagel et al. .
4,459,672 7/1984 Buennagel et al. .
4,463,340 7/1984 Adkins et al. .
4,468,664 8/1984 Galvin et al. .
4,473,821 9/1984 Yang et al. .
4,478,468 10/1984 Schoen et al. .
4,485,374 11/1984 Meserow et al. .

| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|
| DM | DM | H7 | H6 | H5 | H4 | H3 | H2 | H1 | HØ | DS | DS | DM | DM | H7 | H6 | H5 | H4 | H3 | H2 | H1 | HØ | DS | DS |
| Alarm Code | | House Code | | | | | | | | Spacer | | Alarm Code | | House Code | | | | | | | | Spacer | |

Relay Module Alarm Message

| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 |
|---|---|---|---|---|---|---|---|---|---|---|---|---|---|---|---|---|---|---|---|---|---|---|---|---|---|---|---|
| DM | DM | DM | DM | H7 | H6 | H5 | H4 | H3 | H2 | H1 | HØ | DS | DS | DM | DM | DM | DM | H7 | H6 | H5 | H4 | H3 | H2 | H1 | HØ | DS | DS |
| Low Battery Code | | | | House Code | | | | | | | | Spacer | | Low Battery Code | | | | House Code | | | | | | | | Spacer | |

Relay Mobile Low Battery Message

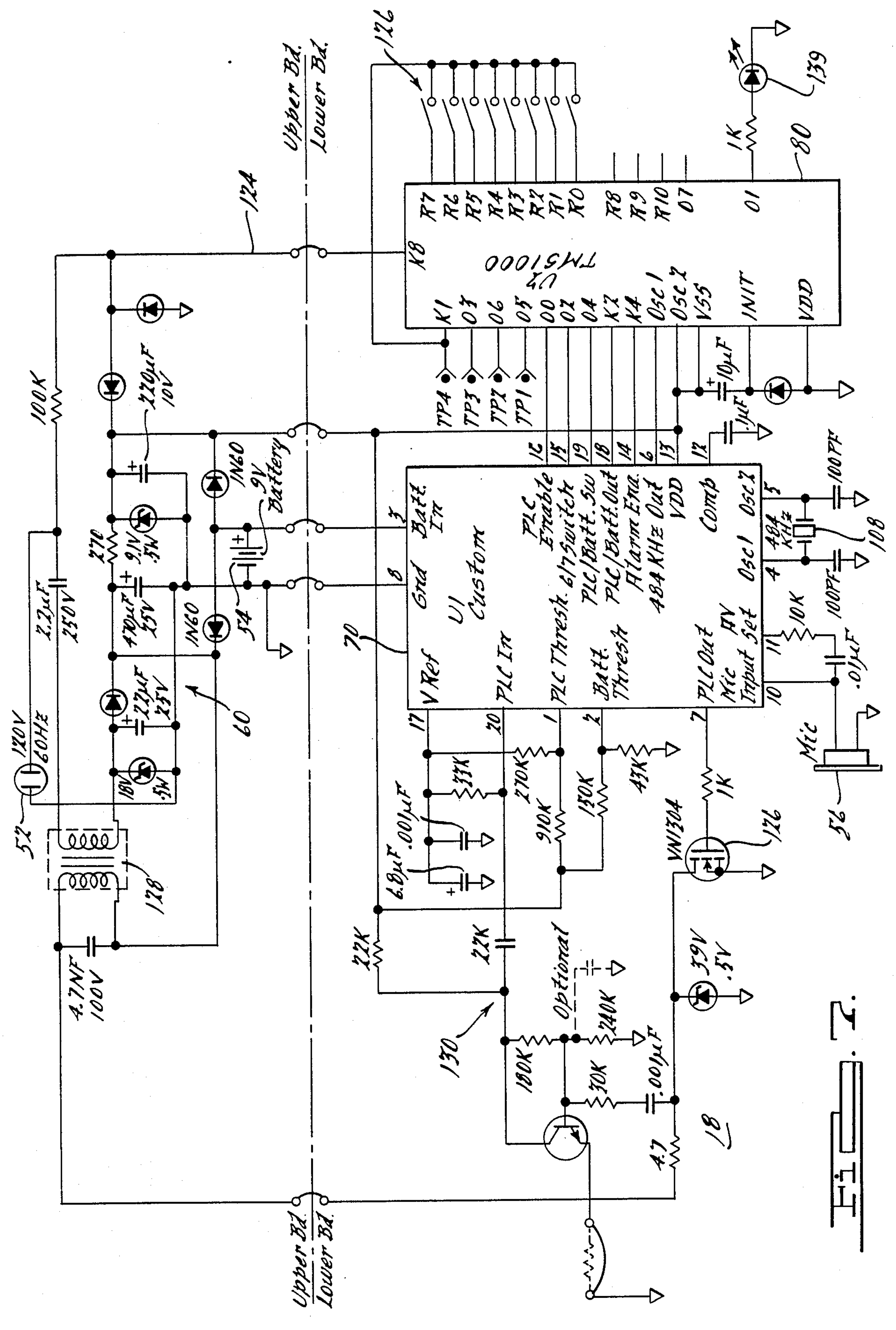
Upper Bd.
Lower Bd.
TMS1000
U2
U1
Custom
9V Battery
Optional
Mic
VN1304
120V 60Hz
4.7NF 100V
2.2μF 250V
100K
220μF 10V
470μF 25V
22μF 25V
1N60
484 KHz
100PF
6.8μF
.001μF
.01μF
10μF
22K
180K
240K
30K
910K
150K
270K
33K
43K
10K
1K
4.7
52
54
56
60
70
80
108
124
126
128
130
139
18

Piezo
VDD
Gnd
Data In
Clock
Load
Display Strobe
Key Strobe
U1 MP7040
U3 4049
U4 Custom
2N3904
VN1304
TIP31
LM 2931
9V Battery
MDV1
Mic
60Hz 120V
PLC Windows
CHL Windows
Low Bat/PLC St
Alarm Signal
617KHz Sw
Carrier Ena
PLC Thres.
VRef
PLC In
484KHz Out
PLC Ena
Osc 1
Osc 2
Mic Bypass
VSS COMP
Mic AVSet
20

SECURITY CONTROL SYSTEM

This is a continuation of U.S. patent application Ser. No. 744,796, filed June 13, 1985, now abandoned.

BACKGROUND AND SUMMARY

The present invention relates to security control systems and in particular to a security control system that combines wireless communication and communication over the existing power lines in a building or dwelling.

Most conventional security systems fall into two main categories: wireless and hard-wired. The wireless systems typically employ ultrasonic or radio frequency signals to communicate information from entry sensing devices to central alarms. While such systems generally possess the inherent advantage of easy installation, wireless security systems tend to be plagued by a relatively high percentage of false alarms. This is due in large part to the congested state of the airways. In addition, because radio frequency signals pass readily through walls of buildings and homes, the possibility of a system in one building falsely triggering a system in an adjacent building is greatly increased. In this regard, it must be borne in mind that even a relatively low false alarm rate of once every several hundred hours of use may be sufficient to cause a loss of confidence in the reliability of a system.

Hard-wired systems, on the other hand, are generally more reliable and less subject to false triggering. However, hard-wired systems require the installation of a separate, dedicated wiring system, which for most consumers, renders such systems prohibitively expensive.

Accordingly, it is the primary object of the present invention to provide an improved security control system that is reliable, relatively inexpensive, and simple to install.

In addition, it is an object of the present invention to provide an improved security control system that utilizes wireless audio communication and power line communication to facilitate system installation.

Moreover, it is an object of the present invention to provide a security control system that also provides the ability to remotely control the operation of various loads, including lights and appliances.

Furthermore, it is an object of the present invention to provide an improved security control system that cannot be readily defeated by an intruder and yet is easily disarmed following an authorized entry.

In general, the security control system according to the present invention comprises: an entry detector, a signal relay module, a controller, and a slave module. The entry detector is battery powered and adapted to be mounted at each door and window of a home or building. Upon the opening of a protected door or window, a coded audible signal is emitted by the entry detector. The coded audible signal is received either directly by the controller if located within sufficiently close proximity to the activated entry detector, or by a signal relay module. The signal relay module is adapted to be plugged into a conventional wall outlet and is intended to be placed in each room or area of the home or building in which an entry detector is located. Only one signal relay module is required in each room or area, regardless of the number of entry detectors located in the room or area. The function of the signal relay module is to receive the coded audible signal emitted by the entry detector and transmit in response thereto a digital pulse coded signal over the power lines to the controller. The controller is also adapted to be plugged into a convention wall outlet and is adapted to receive and transmit digital pulse coded signals over the power lines, in addition to being able to receive coded audible signals directly from an entry detector as previously mentioned. In response to the receipt of a signal either directly from an entry detector or from a signal relay module, the controller is adapted to transmit a digital pulse coded alarm signal over the power lines to the slave modules. The slave modules are similarly plugged into the wall outlets and serve to control the actuation of various loads, such as an alarm, siren, or lamp, or control the performance of a specified task, such as a telephone dialer. In addition, the controller can selectively address individual slave modules to provide a user with•the ability to remotely control the actuation of lights and appliances, or other such loads. Thus, the controller according to the present invention allows the system to function as a security system or as a remote control system.

When operated as a security system, the present system provides two basic modes of operation: INSTANT-ARMED and ARM-DELAY. In the INSTANT ARMED mode, the cntroller is programmed to activate an internal alarm and transmit an alarm signal to the slave modules to immediately actuate the alarm devices upon the receipt of an intrusion signal. This mode of operation is intended to be used, for example, when a home is occupied at night and the homeowner desires to be instantly notified of an attempted unauthorized intrusion. The ARM-DELAY mode, on the other hand, is used when setting the system before leaving the protected premises, so that upon return the owner is provided with a predetermined time period subsequent to re-entry in which to enter a secret disarm code into the controller to inhibit actuation of the alarm. Unlike conventional security systems in which this delay function is implemented at the controller, in the present system the time delay function is contained within the remotely located slave modules. More particularly, when in the ARM-DELAY mode, the controller is programmed upon receipt of an intrusion signal to transmit a coded signal over the power lines to the remotely located slave units which is effective to initiate a digital timer in each slave unit. Once initiated, the slave units will automatically activate their respective loads or perform their respective tasks upon expiration of the predetermined delay period unless a disarm signal is received over the power lines from the controller. The controller is programmed to transmit this disarm signal only upon entry of a secret user-selected code. Accordingly, it will be appreciated that the present system cannot be defeated by a burglar simply disconnecting or disabling the controller within the time delay period provided in the ARM-DELAY mode.

An additional significant feature of the present security control system consists of the unique coded audio communication link between the entry detectors and the signal relay modules and controller(s). In the preferred embodiment, the coded audible signal transmitted by an entry detector upon detection of an intrusion event comprises alternating 6 KHz and 7.3 KHz tone bursts with predetermined spacing between successive tone bursts to eliminate echo problems. The selection of the particular frequencies used in the coded audio link is based primarily on the following considerations: (1) audible signals provide the owner with a measure of assurance that the entry detector/transmitters are functioning properly, (2) the use of signals in the audible frequency range significantly reduces the possibility of one system falsely triggering adjoining systems, and (3) the relatively low degree of natural occurrence of the frequencies.

The audio receivers in the signal relay modules and in the controller function in accordance with the Constant False Alarm Rate ("CFAR") principle to effectively isolate the coded signal from background noise and thereby predictably control the probability of false alarms and provide a predictable signal-to-noise ratio. The audio receivers also include unique decoding circuitry which utilizes the exclusion principle by sequentially looking for the simultaneous presence of the 6 KHz tone and the absence of the 7.3 KHz tone followed by the simultaneous presence of the 7.3 KHz tone and the absence of the 6 KHz tone. The result of these combined features is a highly reliable audio communication link that virtually eliminates the possibility of false alarms.

Also of significance to the security control system according to the present invention is the power line communication technology used to reliably transmit information between the signal relays, controller, and slave modules. Information between the relay, controller, and slave modules is communicated over the power lines by impressing a relatively high frequency (e.g., 121 KHz) carrier signal onto the power lines. The transmitted messages are in digital pulse coded form with individual binary data bits being represented by a carrier frequency burst or "pulse" that is generated during predetermined periods of the 60 Hz AC waveform. Specifically, a binary "1" is represented by a pulse produced during the first half of the 60 Hz AC waveform and a binary "0" is represented by a pulse produced during the second half of the AC waveform. Thus, synchronization between the various units is achieved by synchronizing the transmission and receipt of the digital pulse coded signals to the 60 Hz AC waveform. In addition, in the preferred embodiment of the present invention the signal relay modules and controllers are microprocessor-based and include programmed algorithms for checking the AC power line prior to transmission of a message to determine if another device is already transmitting a message or if there exists an unacceptable level of noise on the AC power line which would preclude the reliable transmission and receipt of a message. If either the presence of intelligence or an unacceptable noise level is detected, the devices are programmed to execute a randomly generated time delay before retransmission is attempted. In this manner, the potential priority conflict over power line access is resolved and the likelihood of two devices creating a perpetual standoff condition is avoided.

To prevent the present security control system from being rendered imoperable by the loss of AC power, the units in the system which rely mainly upon AC power—namely the signal relay, controller, and certain of the slave units—are each provided with battery backup power which is automatically enabled when primary AC power is lost. These units also include internal quartz crystal or ceramic resonator oscillator circuits that are utilized to provide the units with accurate timing signals which permit the units to communicate asynchronously when primary AC power is absent. These internal timing circuits also provide the carrier frequency used for power line communication.

Additional objects and advantages of the present invention will become apparent from a reading of the following detailed description of the preferred embodiment which makes reference to the accompanying drawings in which:

BRIEF DESCRIPTION OF THE DRAWINGS

FIG. 5 is a circuit diagram of the transmitter module of the entry detector;

FIG. 6 is a timing diagram of the coded audio signal transmitted by the transmitter module of the entry detector;

FIG. 7 is a circuit diagram of the relay module;

DETAILED DESCRIPTION OF THE PREFERRED EMBODIMENT

Figure 1:
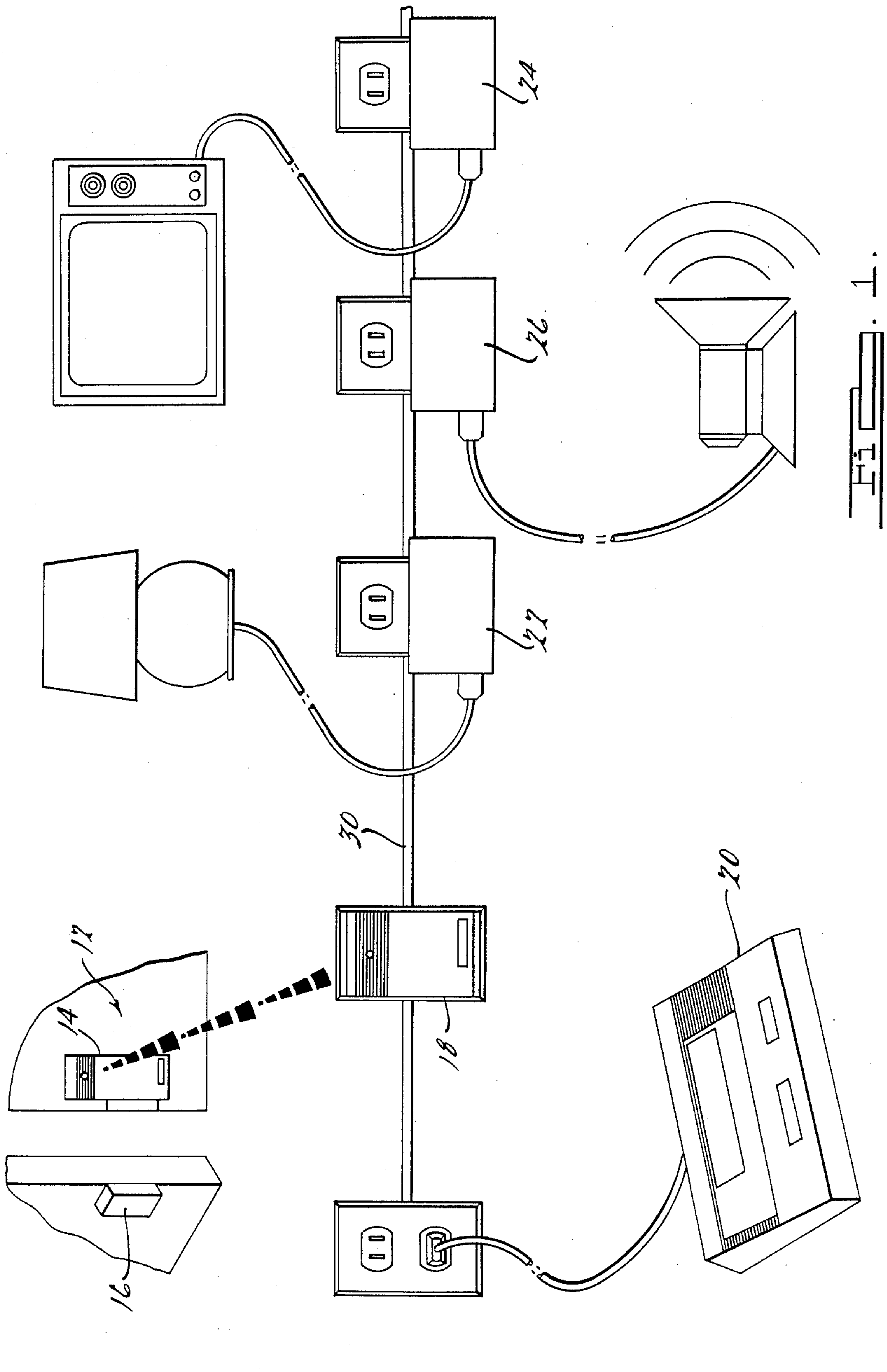
FIG. 1 is a diagrammatical illustration of the security control system according to the present invention showing the various components of the system and their interrelation in a typical installation.
Figure 3:
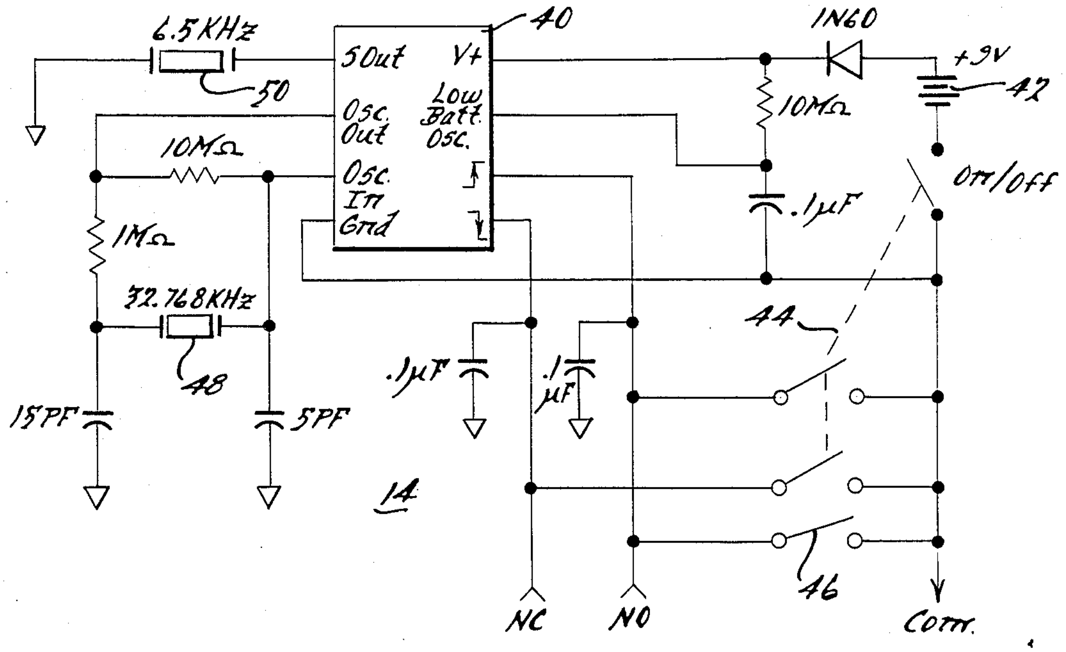
FIGS. 3A and 3B are timing diagrams illustrating the formats of the relay module messages.

Referring to FIG. 1 a diagrammatical view of the security control system 10 according to the present invention is shown. The present invention is capable of functioning both as a control system and as a security system. When used as a security system, the present invention is capable of detecting an entry at any protected door or window and performing a variety of functions in response to such detection, including sounding an alarm, activating an outside siren, turning on lights, and/or enabling an automatic telephone dialer. In general, the security system comprises: the entry detector 12, the signal relay module 16, the controller 20, and the slave modules 22, 24, and 26. An entry detector 12 is adapted to be located at each entry point in the protected premises. Thus, in a home installation, it is preferable to locate an entry detector 12 at each door and window in the house. The entry detector 12 comprises a module 14 which includes an audio transmitter as well as a sensor switching circuit for controlling the enabling of the audio transmitter circuit. In the preferred embodiment, the entry detector 12 further includes a permanent magnet 16 which is adapted to be mounted to the door or window adjacent to the transmitter module 14. Thus, when the door or window is opened, the movement of the magnet 16 past the module 14 actuates the sensor switch in the transmitter module 14, thereby activating the audio transmitter circuit. As will readily be understood by those skilled in the art, other types of entry sensing devices for providing an ON/OFF switching signal can readily be substituted for the magnet and reed switch-type sensor utilized in the preferred embodiment.

When the entry detector 12 detects an entry, the audio transmitter module 14 is adapted to produce a coded audible signal that is received either directly by the controller 20 or by a signal relay module 18. The function of the relay module 18 is to relay the intrusion signal from an entry detector 12 over the power lines 30 to the controller 20. The relay modules are installed simply by plugging the devices into conventional 120 volt AC wall outlets. In a typical home installation, a relay module 18 is therefore required in each room or open area in which an entry detector 12 is located, except for those entry detectors 12 monitored directly by a controller 20.

The system controller 20 is similarly adapted to be plugged into a conventional 120 volt AC wall outlet. In addition to receiving and decoding coded audio intrusion signals from directly monitored entry detectors 12, the controller 20 also receives and interprets coded power line signals from the relay modules and transmits coded instruction signals over the power lines 30 to the various slave modules 22, 24, and 26. The slave modules 22, 24, and 26 are similarly adapted to be plugged into the wall outlets and comprise either lamp modules 22, appliance modules 24, or alarm modules 26, depending upon the particular load to be controlled. Any desired number of slave modules may be distributed throughout a home or building. The slave modules receive the coded instruction signals over the power lines from the controller 20 and control the energization of their respective loads in accordance with such instruction signals. Thus, in response to the receipt of an intrusion signal, the controller 20 is programmed to transmit appropriate instruction signals over the power lines to direct the various slave modules 22, 24, and 26 to activate their respective loads.

In addition, other types of slave devices, such as automatic telephone dialers, can be advantageously employed. In this regard, it is to be understood that when used as a security system, the present invention contemplates the use of any desired type of alarm response device and that accordingly, when reference is made in the specification and claims to an "alarm device", it is intended to include audio and visual alarm response devices, as well as other types of alarm response devices, such as automatic telephone dialers and the like. It should also be noted that the present security control system 10 contemplates the use of multiple controllers. In such applications, the entry of an operating status change on one controller is immediately communicated over the power lines to the other controller(s) to insure that the operating status of all controllers in a system is maintained the same. In addition, whenever a new secret code is established for a system and entered into one controller, the new secret code is automatically communicated over the power lines to the other controllers in the system.

The present security system is selectively ARMED at a controller 20 for either INSTANT-ARM or ARM-DELAY operation, the latter permitting the occupants to exit and re-enter the protected premises without triggering the alarm. In particular, in the ARM-DELAY mode, the owner has two minutes in which to exit the premises following arming of the system and 40 seconds following re-entry into the protected premises in which to enter a secret DISARM code into a controller 20 to about the alarm sequence. Significantly, the mere disabling of a controller 20 within the 40-second delay period will not prevent the slave modules 22, 24, and 26 from activating their respective loads following the expiration of the delay period. As will subsequently be explained in greater detail, this is accomplished by providing the slave modules 22, 24, and 26 with internal timing circuitry which implements the 40-second delay period following receipt from the controller 20 of a countdown signal. Thus, practically speaking, the slave modules 22, 24, and 26 will only abort their timing function upon receipt of a DISARM signal over the power lines 30 from the controller 20.

In addition, the controller 20 and slave modules 22 and 24 of the present system 10 can also be utilized as a central control system for providing remote control of various lamps and appliances. Specifically, the control signals produced by the controller 20 and transmitted over the power lines 30 include an address or unit code as well as an instruction code and the various slave modules are programmed to respond only to those signals having a unit code corresponding to their uniquely assigned address. Thus, the controller 20 can selectively operate the various loads connected to the slave modules 22 and 24. For security and reliability reasons, the relay modules 18, controller 20, and slave modules 22, 24, and 26 also have associated therewith a house code which prevents power line communications from one system causing an undesired response in an adjoining system. The house code associated with the system 10 is transmitted as part of each coded signal transmitted over the power lines 30.

POWER LINE COMMUNICATION (PLC) FORMATS

Before proceeding with the detailed description of the various devices in the system, an understanding of the power line communication formats used in the present system is appropriate. The relay modules 18 and controller(s) 20 communicate over the power lines by impressing onto the 60 Hz AC line a relatively high frequency carrier signal. The carrier frequency used in the preferred embodiment comprises 121 KHz. Information is transmitted between the various units by digital pulse code modulation ("PCM") of the carrier signal. Specifically, and with particular reference to FIG. 2, the location of the carrier frequency pulse burst relative to the 60 Hz AC waveform determines the data content of the signal. As illustrated in the timing diagrams in FIG. 2, if a carrier frequency pulse burst occurs during the first half of the 60-cycle AC waveform, the pulse corresponds to a binary "1". Conversely, if a carrier frequency pulse burst occurs during the second half of the 60-cycle AC waveform, the pulse corresponds to a binary "0". Thus, it will be appreciated that a complete cycle of the 60 Hz AC waveform is used to transmit each data bit of information in a power line communication message.

Additional data formats used in the preferred embodiment include the Double Mark ("DM"), which comprises a carrier frequency pulse burst during both the first and second half cycles of the 60 Hz AC waveform, and the Space which corresponds to an absence of a carrier frequency pulse burst during both halves of the 60 Hz AC waveform. The DM-Data One sequence is used as a preamble to designate the beginning of a data transmission as the resulting succession of carrier frequency pulses over three consecutive half cycles of the 60 Hz AC waveform represents a condition which cannot occur during normal data transmission of binary 1's and 0's. The DM signal code also serves to provide the reference for identifying the "first" and "second" halves of the 60-cycle AC waveform. The double Space format is likewise used at the end of each message to designate the end of a data transmission. As will subsequently be seen, this is necessary as the different messages used in the present power line communication system are not all of equal length. Therefore, the end of a data transmission must be definitively identified.

Figure 2:
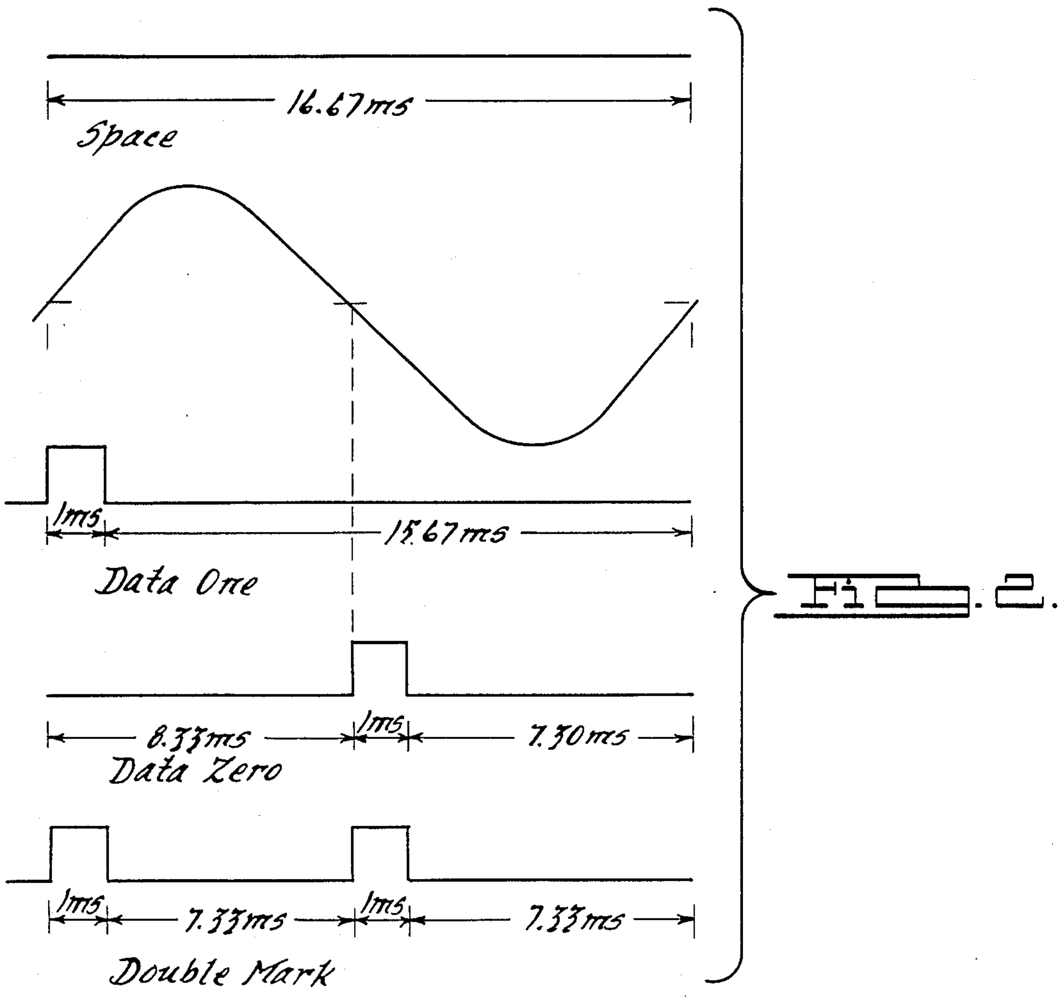
FIG. 2 is a timing diagram illustrating the power line communication data code formats.

As will further be noted from the timing diagram shown in FIG. 2, the 121 KHz carrier signal data pulses are initiated at the zero-crossing points in the 60 Hz AC waveform. The duration of each carrier frequency pulse burst is preferably one millisecond in a relay message (as shown in FIG. 2) and 7.33 milliseconds in a controller message.

Figures 2, 3A, 3B:
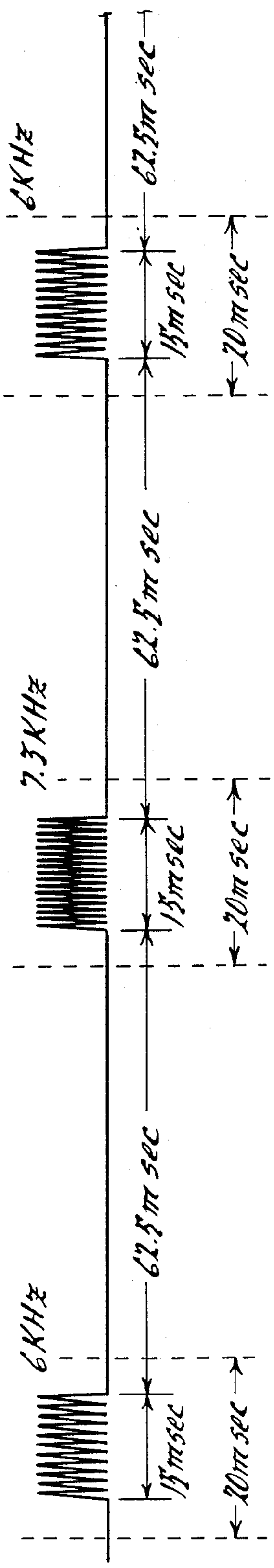

Turning now to FIGS. 3A and 3B, the formats of the relay module messages in the preferred embodiment are shown. It will readily be appreciated that a virtually infinite variety of message formats could be used. The present formats were selected as providing an acceptable compromise between the number of available code selections and signal transmission bandwidth. Importantly, however, by not requiring all system messages to be of equal length, several message formats in the preferred system can be made significantly shorter than others, thus reducing the required bandwidth of such transmissions. In addition, due to the overall reliability of the power line communication technology employed in the present system, it is unnecessary to repeat message transmission to insure proper receipt.

The first relay module message format illustrated in FIG. 3A comprises the ALARM message which is transmitted over the power lines to the controller 20 whenever a valid audio signal is received from an entry detector. The relay ALARM code selected in the preferred system comprises two successive Double Marks. In addition, each power line communication always includes the transmission of the system's assigned House Code, which serves to distinguish the power line communications of one system from those of another. An eight-bit House Code is used in the preferred embodiment which provides $2^8$ or 256 possible codes. Following transmission of the House Code, the ALARM message concludes with a double Space.

The second relay module message format illustrated in FIG. 3B comprises the LOW BATTERY message which is transmitted over the power lines to the controller whenever the voltage level of the backup battery power source is determined to be below a specified minimum value. The relay LOW BATTERY message in the preferred embodiment comprises four consecutive Double Marks, followed by the system's assigned House Code and the concluding double Space.

Figure 4A:
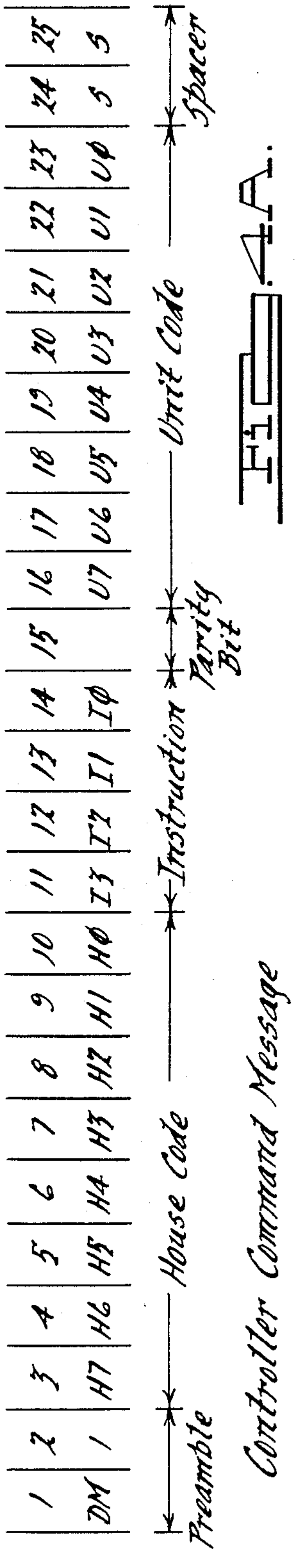
FIGS. 4A, 4B, and 4C are timing diagrams illustrating the formats of the controller messages.
Figure 4B:
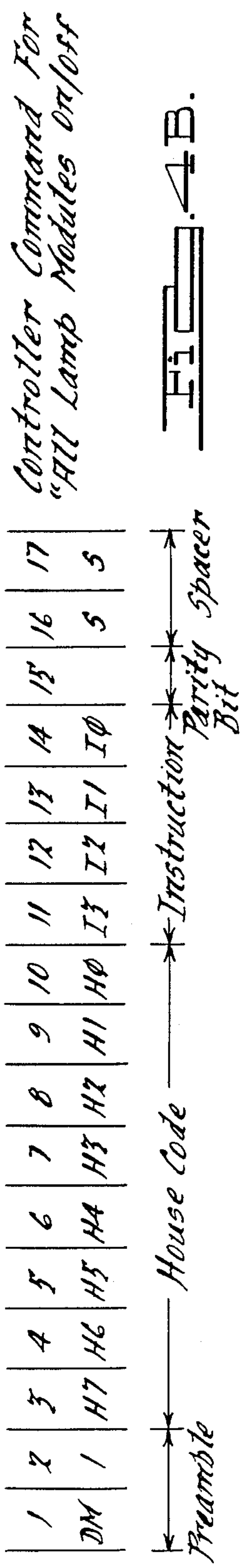
Figure 4C:
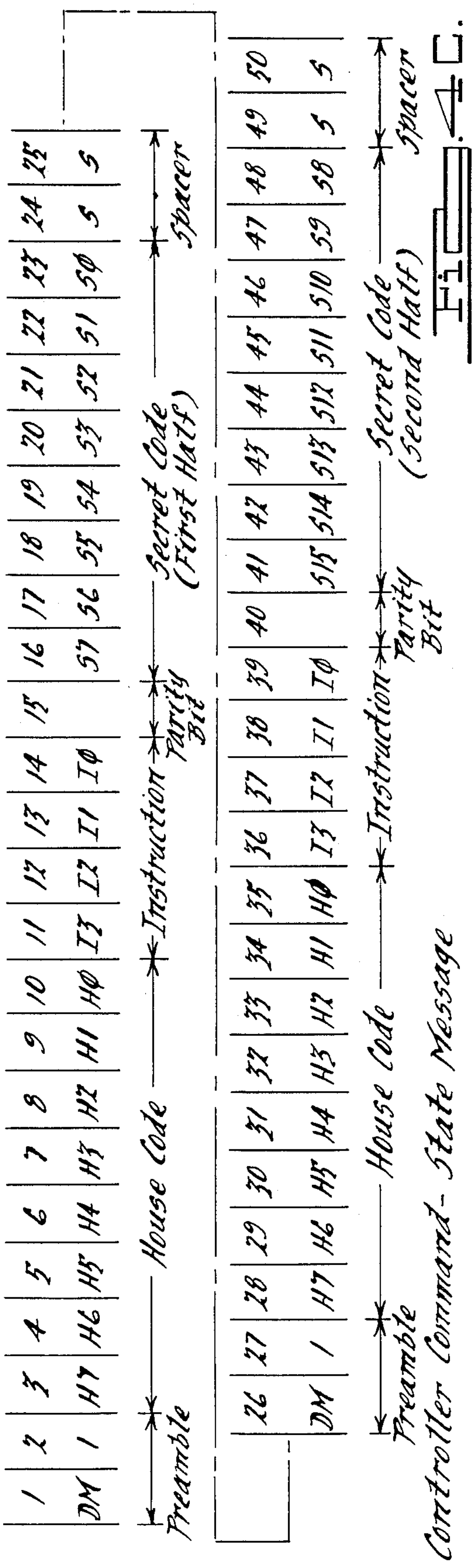

Referring now to FIGS. 4A, 4B, and 4C, the formats for the power line communication commands for the controller 20 are shown. When utilized as a central control system, the controller code format is capable of selectively accessing and controlling individual slave modules. The basic message format of a Controller Command Message illustrated in FIG. 4A for the implementing the remote control function includes a Preamble, comprised of a DM-Data One, followed by an 8-bit House Code, a 4-bit Instruction Code, a single Parity Bit, an 8-bit Unit Code, and the concluding double Space. The state of the Parity Bit in the preferred embodiment is determined by number of binary "1" bits in the Controller Command Message; a "1" parity bit corresponding to an even number and a "0" parity bit corresponding to an odd number. The 4-bit Instruction Code identifies the particular task to be performed by the slave module and may, for example, include such remote control functions as "unit on", "unit off", "dim lamp", etc. The 8-bit Unit Code serves to uniquely identify the desired slave module to be controlled. As will subsequently be seen from the description of the lamp module illustrated in FIG. 13, a slave module will only respond to a Controller Command Message if the House Code and Unit Code in the message correspond to the particular House and Unit Codes preset for that particular slave module.

Additionally, the controller 20 in the preferred embodiment is provided with a separate command illustrated in FIG. 4B for turning on or turning off all lamp modules in the system. The format of this command comprises simply the Preamble, 8-bit House Code, 4-bit Instruction Code, Parity Bit, and double Space. In that the command is intended to access all of the lamp modules in the system, no Unit Code is required.

The format of the coded messages transmitted by the controller when operated in the security mode differ from the format of the command messages described above because security mode instructions are not selectively addressed to a particular slave module. Accordingly, the transmission of a Unit Code is not required. The basic CONTROLLER STATE COMMANDS used when the system is operated in the security mode include: (1) INSTANT ARM, (2) ARM-DELAY, (3) DISARM, (4) ALARM, and (5) COUNTDOWN. The controller is placed in either of the INSTANT-ARM or ARM-DELAY security modes by actuating the appropriate mode select switch on the front panel of the controller 20. The controller 20 is programmed to transmit the appropriate INSTANT-ARM or ARM-DELAY COMMAND message when placed in either of these armed states for the sole purpose of updating the status of any additional controllers which may be included in the system. When the present invention is used in an application having only one controller, the transmission by the controller of an INSTANT-ARM or ARM-DELAY status command is not necessary. The ALARM COMMAND or the COUNTDOWN COMMAND is transmitted by the controller in response to the receipt of either a RELAY ALARM signal over the power lines or a coded audio signal from an entry detector 12. The ALARM COMMAND message is transmitted when the controller is in the INSTANT-ARM state and the COUNTDOWN COMMAND message is transmitted when the controller is in the ARM-DELAY state. The slave modules are programmed to respond to the receipt of the ALARM COMMAND from the controller by immediately performing their respective tasks. Conversely, the slave modules are programmed to initiate a 40-second delay timer upon receipt of the COUNTDOWN COMMAND from the controller before performing their respective tasks. The DISARM COMMAND message is transmitted by controller 20 whenever the controller is placed in the DISARM mode. The controller is switched from the INSTANT-ARM or ARM-DELAY modes to the DIS- ARM mode by entering on a keyboard located on the front panel of the controller a secret five-digit code pre-selected by the owner. The slave units are programmed to respond to the receipt of a DISARM COMMAND from the controller by ceasing to perform their respective tasks if previously activated, or by aborting their 40-second delay timers.

Each of the above-described controller state command messages uses the same coded format which is illustrated in FIG. 4C. As can be seen from the diagram, the message is divided into two segments. The first segment comprises the Preamble, 8-bit House Code, 4-bit Instruction Code, Parity Bit, 8-bit Secret Code, and double Space. The second segment similarly comprise the Preamble, 8-bit House Code, 4-bit Instruction Code, Parity Bit, 8-bit Secret Code, and double Space. The Secret Code in the preferred embodiment comprises a five-digit number (each digit comprising a decimal number 1-5) in order to provide a suitable number of possible code combinations. Accordingly, the binary coded decimal representation of the Secret Code requires three bits for each digit or 15 total bits of information. Accordingly, in order to maintain uniformity in the controller message formats, the message transmission is divided into two segments with the second segment of the message duplicating the first segment except for the Secret Code portion of the transmission. Specifically, the first segment includes the first seven bits of the Secret Code and the second segment includes the last eight bits of the Secret Code. A "0" is arbitrarily inserted into the first slot of the Secred Code portion of the message.

ENTRY DETECTOR (12)

Referring to FIG. 5, a circuit diagram of the transmitter module 14 of the entry detector 12 according to the present invention is shown. As will be recalled, the transmitter module 14 is adapted to respond to the proximate movement of the externally located permanent magnet and produce in response thereto a coded audible signal comprised of sequentially alternating 6 KHz and 7.3 KHz frequency tones with predetermined spacing between successive tones. With additional reference to FIG. 6, a timing diagram illustrating the coded audible signal produced by the transmitter module 14 in the preferred embodiment of the present invention is shown. In particular, the coded audible signal generated by the transmitter module 14 comprises an initial 6 KHz tone burst of approximately 15 milliseconds in duration ("A"), followed by a 62.5 millisecond pause, and then a second 15 millisecond tone burst at a frequency of 7.3 KHz ("B"). This alternating tone signal is repeated five times ("ABABABABAB") with a 62.5 millisecond gap between successive tones. The period of the spacing between successive alternating frequency tones is selected to be sufficiently long to eliminate potential echo problems (as explained in greater detail below), and at the same time sufficiently brief to insure that the length of the entire transmission is kept relatively short; i.e., less than three-quarters of a second.

Returning to FIG. 5, the transmitter module 14 in the preferred embodiment is comprised primarily of a custom integrated circuit 40 which produces the 6 KHz and 7.3 KHz alternating frequency tone signals in the timed sequence pattern described in FIG. 6. The circuit is powered by a portable 9 volt battery source 42 which is connected to the V+ input of the integrated circuit 40. In the preferred embodiment the custom integrated circuit 40 includes a low-battery detection circuit for monitoring the voltage level of the battery 42 and producing a unique low-battery output signal when the voltage level of the battery falls below a predetermined level. The transmitter circuit 14 is energized by placing the internal mode switch 44 in the ON position. With mode switch 44 in the ON position, the integrated circuit 40 will respond to a detected change in the state of switch contact 46 which is responsive to the proximate movement of the externally located magnet 16 (FIG. 1). In particular, sensor switch 46 is connected to the (+TR) input terminal of the custom integrated circuit 40 which comprises the input to a trigger circuit that is adapted to detect a change in the state of either of the switch contact inputs (+TR) and (−TR). The external connections shown in the circuit diagram are provided to permit the transmitter module 14 to be optionally utilized with any external entry sensor which provides a contact opening or closing.

The custom integrated circuit 40 additionally includes counter circuitry and a sequence coder which is responsive to the trigger circuitry for controlling the alternating 6 KHz and 7.3 KHz frequency transmission. The 6 KHz and 7.3 KHz frequency signals are in turn produced by a frequency divider circuit within the custom integrated circuit 40 which divides down the 32.768 KHz frequency signal provided to the OSC-IN and OSC-OUT terminals of the custom IC 40 from a quartz watch crystal 48. The sequence coder in turn feeds an output amplifier that is connected to the transducer 50, which in the preferred embodiment comprises a piezoelectric device having a fundamental frequency of 6.5 KHz. It has been determined that a single piezoelectric transducer having a fundamental frequency approximately midway between the desired output frequencies of 6 KHz and 7.3 KHz can be used to produce both frequency tones at acceptable db levels.

SIGNAL RELAY MODULE (18)

Figure 8:
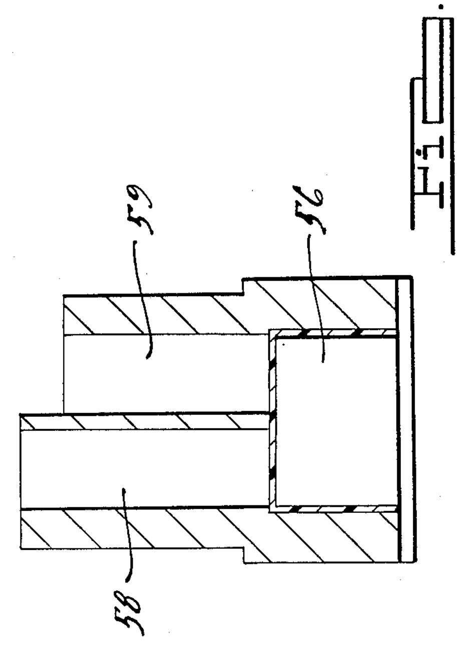
FIG. 8 is a sectional view of the mechanical tuned audio ports in the casing of the relay module.

Turning now to FIG. 7, a circuit diagram of the signal relay module 18 according to the present invention is shown. The function of the relay module 18, it will be recalled, is to receive the coded audible signal from the entry detector 12 and transmit in response thereto a digital pulse coded signal over the power lines to the controller 20. The relay module 18 in the preferred embodiment is comprised primarily of a power supply circuit 60, a custom integrated circuit 70, and a 4-bit microprocessor 80. The relay module 18 is adapted to be plugged into a conventional wall outlet and accordingly receives primary power from the 120-volt, 60-cycle AC signal. In the event of a loss of primary power, however, a portable battery backup source 54 is also provided. The coded audible signal from the entry detector 12 is received by a transducer 56 which, in the preferred embodiment comprises a microphone that is mounted at the base of a pair of tuned mechanical ports. With additional reference to FIG. 8, the casing of the relay module 18 includes a pair of tuned ports 58 and 59 which comprise 1/16th wavelength resonators that act as simple mechanical bandpass filters to substantially exclude or attenuate noise and audible signals other than the desired 6 KHz and 7.3 KHz tones emitted by the entry detector 12 prior to the conversion of the tones into electrical signals by the microphone 56.

Figure 9:
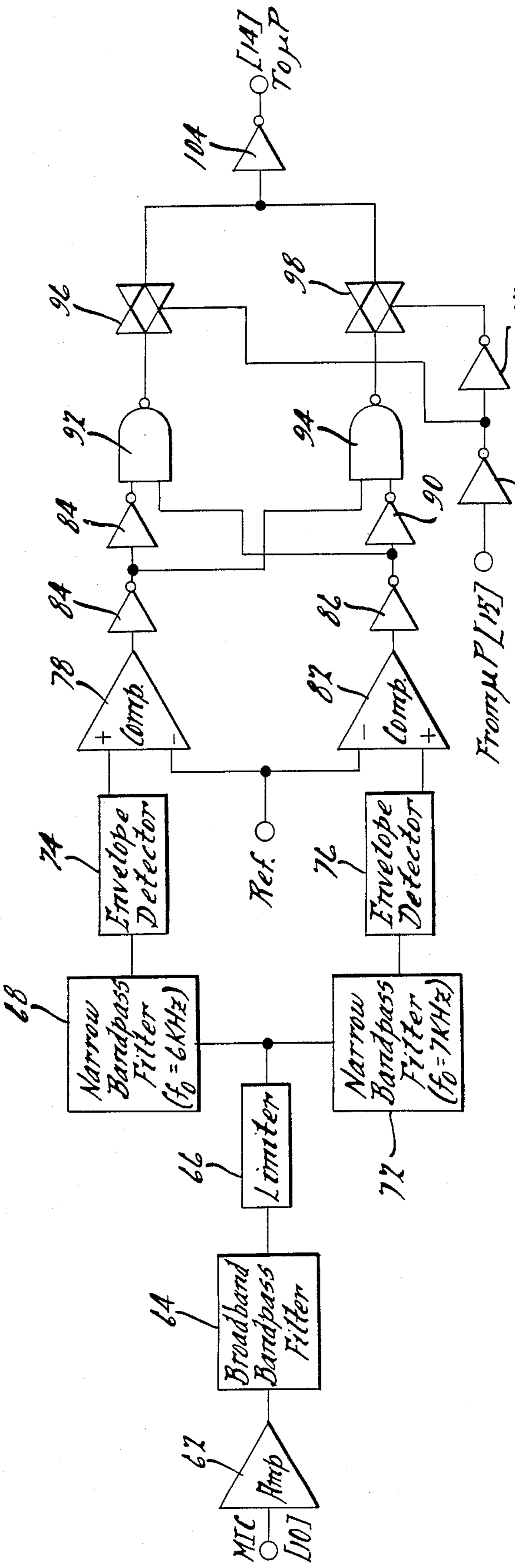
FIG. 9 is a more detailed circuit and block diagram of the CFAR receiver in the custom integrated circuit contained in the relay module illustrated in FIG. 7.

Returning to FIG. 7, the output from the microphone 56 is provided to an input of the custom integrated circuit 70 which corresponds to the input of a constant false alarm rate ("CFAR") receiver for detecting the audio 6 KHz/7.3 KHz signal from the entry detector 12. With additional reference to FIG. 9, a more detailed circuit and block diagram of the CFAR receiver used in the preferred embodiment of the present invention is shown. Initially, the output signal from the microphone 56 is provided through an amplifier 62 to a broadband bandpass filter 64. The output from the broadband bandpass filter is then provided to a limiter circuit 66 which in turn has its output provided to a pair of narrow bandpass filters 68 and 72 having fundamental frequencies centered at 6 KHz and 7.3 KHz, respectively. In an environment rich with white noise and multipath signals, such as is created when audio signals are transmitted in a house or building, it is important to concentrate the decoding effort on the strongest reflected signal. The combination of the broadband bandpass filter, the limiter, and the narrow bandpass filter signal processing accomplishes this by extracting the strongest signal in the spectrum. More specifically, the limiter circuit 66 serves as a constant energy black box by providing energy to the strongest signals received from the output of the broadband bandpass filter 64. Thus, the limiter circuit 66 accentuates the difference between the strong information signal and the relatively weaker background noise. Note, that if only the narrow bandpass filters 68 and 72 were used, some form of automatic gain control would be required to compensate for differing levels of background noise. Automatic gain control, however, introduces unacceptable delays in the decoding process, in addition to requiring high "Q" bandpass filters which are difficult to implement an integrated circuit form. In this regard, it will be appreciated that whereas a receiver with automatic gain control will typically "miss" a valid signal that occurs immediately following a noise transient, the present CFAR receiver will properly recognize such a signal as the gain in the CFAR receiver is not being constantly adjusted.

The outputs from the narrow bandpass filters 68 and 72 are provided to envelope detectors 74 and 76, respectively. The envelope detectors 74 and 76 insure that the signals passed by the narrow bandpass filters 68 and 72 are of sufficient duration to constitute valid signals. In addition, the envelope detectors 74 and 76 serve to eliminate any short dropouts in the output signals from the narrow bandpass filters 68 and 72 which may occur as a result of the "nulling" of two signals of the same amplitude and opposite phase angle. The outputs from the envelope detectors 74 and 76 are provided to a pair of comparators 78 and 82, respectively, which serve as threshold detectors to establish a minimum quality level which the received signals must exceed in order to be accepted as valid signals. In the preferred embodiment, the magnitude of the reference signal provided to the threshold detectors 78 and 82 is selected to be one-half the maximum output level from the narrow bandpass filters 68 and 72.

At this point, the relationship between the operating characteristics of the CFAR receiver and the 62.5 millisecond delay period between successive tones in the audio intrusion signal can now be appreciated. In particular, the delay period in the audio intrusion signal is selected to be of sufficient duration to insure that by the time the 7.3 KHz signal, for example, is transmitted, the echoes from the previous 6 KHz transmission are sufficiently weak so that they are excluded or "locked out" by the CFAR receiver. Thus, only the valid 6 KHz and 7.3 KHz tone signals are alternatively passed by the CFAR receiver which makes possible the use of the "exclusion" circuitry described below.

To further enhance the reliability of the audio communication link, the audio receiver in the relay module 18 additionally includes unique logic gating circuitry which successively looks for the presence of the 6 KHz signal and the simultaneous absence of the 7.3 KHz signal, followed by the presence of the 7.3 KHz signal and the simultaneous absence of the 6 KHz signal. In particular, the otputs from the two comparator circuits 78 and 82 are provided to inverters 84 and 86, respectively. The output from inverter 84 is provided to the input of a first NAND-gate 94 and through another inverter 88 to the input of a second NAND-gate 92. Similarly, the output from inverter 86 is provided to the other input of NAND-gate 92 and through an inverter 90 to the second input of NAND-gate 94. The outputs from NAND-gates 92 and 94 are in turn connected to analog switching devices 96 and 98, respectively, before being combined and provided through a final inverter 104 to output pin 14 of the custom integrated circuit 70. The ON/OFF states of analog switches 96 and 98 are controlled by a switching signal supplied by microprocessor 80 to input pin 15 of the custom integrated circuit 70. The switching signal from the microprocessor is provided through a first inverter 100 to the control terminal of analog switch 96 and through a second inverter 102 to the control terminal of analog switch 98.

The logic gating circuitry operates in the following manner. When a valid 6 KHz frequency pulse signal is received, the output of comparator 78 will go HI, thereby providing a HI input signal to NAND-gate 92. However, the output of NAND-gate 92 will not go HI unless there exists simultaneously the absence of a 7.3 KHz signal so that the output of comparator 82 will be LO. In other words, the output of NAND-gate 92 will go HI only when the output signal from comparator 78 is HI and the output signal from comparator 82 is LO. Similarly, when a valid 7.3 KHz frequency pulse signal is subsequently received, the output from comparator 82 will go HI, thereby providing a HI signal to the input of NAND-gate 94. However, the output from NAND-gate 94 will not go HI upon receipt of the HI signal from comparator 82 unless the output signal from comparator 78 is also LO. Accordingly, the output from NAND-gate 94 will go HI upon the receipt of a 7.3 KHz signal only if a 6 KHz signal is simultaneously absent.

The analog switching devices 96 and 98 connected to the outputs of NAND-gates 92 and 94, respectively, are alternatively rendered conductive and non-conductive by the switching signal supplied by the microprocessor 80 to input pin 15 of the custom integrated circuit 70. The microprocessor 80 is programmed to look for the presence of valid 6 KHz and 7.3 KHz signals within predefined "windows". Returning momentarily to the timing diagram of the coded audio signal in FIG. 6, the microprocessor 80 is programmed to look for valid 6 KHz and 7.3 KHz pulse signals within predefined 20 millisecond windows which are centered around the expected locations of the 15 millisecond pulse tone signals. To accomplish this, the microprocessor 80 synchronizes to the audio transmission from the entry detector 12 following receipt of the first valid 6 KHz signal burst by waiting for a time period 2.5 milliseconds less than the full 77.5 millisecond period between the leading edges of successive alternating tone bursts and then looking for a valid 7.3 KHz tone burst signal within the following 20 milliseconds. Although the tone signals produced by the entry detector 12 have a duration of 15 milliseconds, the microprocessor 80 is programmed to accept as a valid signal a tone burst of at least 7.5 milliseconds in duration, as "drop-outs" may occur within the full 15 millisecond period. In addition, the microprocessor 80 in the preferred embodiment is programmed to accept as a valid coded audio signal the receipt of any three successive valid alternating tone signals. In other words, a valid entry detector signal is presumed to have been detected following receipt of a proper 6-KHz-7.3-KHz-6-KHz tone sequence or a proper 7.3-KHz-6-KHz-7.3-KHz tone sequence. Thus, given the fact that the coded audio signal transmitted by the entry detector 12 repeats the 6-KHz-7.3-KHz tone sequence five times, the present system provides a significant margin for error to insure that the coded audio signal is reliably detected by the relay module 18.

Figure 10:
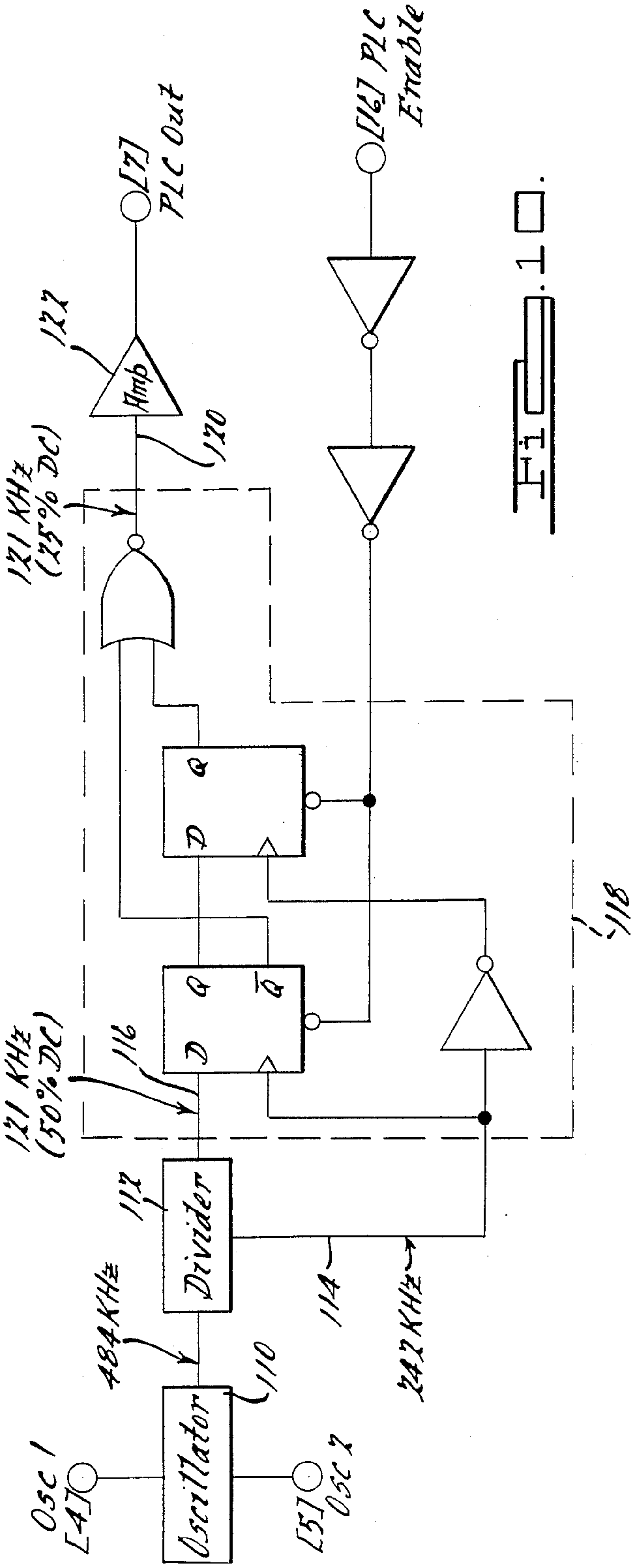
FIG. 10 is a circuit and block diagram of the PLC transmitter portion of the custom integrated circuit of the relay module and controller illustrated in FIGS. 7 and 12, respectively.

Once the microprocessor 80 in the relay module 18 determines that a valid coded audio signal from an entry detector 12 has been received, the RELAY ALARM power line carrier signal is transmitted over the power lines to the controller 20. The PLC transmitter circuit in the preferred embodiment is incorporated in the custom integrated circuit 70. A block diagram of the PLC transmitter in the relay module 18 is illustrated in FIG. 10. The PLC signal, it will be recalled, comprises a pulse code modulated 121 KHz carrier frequency signal that is synchronized to the zero-crossing points in the 60 Hz AC waveform when AC power is present. The 121 KHz carrier frequency signal is produced from a 484 KHz ceramic resonator that is connected to the OSC1 and OSC2 inputs of the custom integrated circuit 70. The OSC1 and OSC2 inputs feed an internal oscillator circuit 110 which produces a 484 KHz oscillator output signal. The 484 KHz oscillator signal is provided to a frequency divider circuit 112 which produces a 242 KHz output signal on line 114 and a 121 KHz output signal on line 116. Both the 242 KHz signal on line 114 and the 121 KHz signal on line 116 from divider circuit 112 are provided to a logic gating circuit designated 118. Logic gating circuit 118 serves to reduce the 50 percent duty cycle of the 121 KHz signal on line 116 to a 25 percent duty cycle on line 120. The resulting signal on line 120 is then supplied through a driver amplifier circuit 122 to the PLC OUT terminal (pin 7) of the custom integrated circuit 70. The transmission of the 121 KHz signal through the logic gating circuit 118, however, is controlled by the microprocessor 80 which supplies the enable signal to the PLC ENABLE input (pin 16) of the custom IC 70. Thus, the microprocessor 80 controls the timing of the transmission of the PLC signal bursts.

Returning to FIG. 7, the microprocessor 80 receives a 60 Hz zero-crossing signal on line 124 from the power supply circuit 60 for timing the PLC signal transmissions in accordance with the pulse coded formats described above. The selected HOUSE CODE for the system is supplied to microprocessor 80 via the setting of switches 126. The resulting PLC OUT signal from the custom IC (pin 7) is impressed onto the power lines via an output driver device 126 and a coupling transformer 128 which is connected across the 120 volt-60 Hz outlet 52.

In view of the fact that a single power line communication "channel" is being used in the present system to transmit messages to and from various devices, the potential problem is presented where more than one device may attempt to transmit a message at the same time. The potential for this problem arising is particularly acute in a security system where simultaneous detection of the same event by more than one device is a real possibility. To avoid the problem of "collision" and the resulting scramble of messages it creates, the microprocessor 80 in the relay module 18 (as well as the microprocessor in the controller 20) is programmed to interrogate the power line before beginning a transmission to determine if intelligence or an excessive amount of noise is present on the line. If either condition is detected, the microprocessor 80 will delay the transmission of its PLC message.

This "anticollision" feature of the present invention is implemented in the following manner. Due to the type of PLC coding formats used in the present system, it is necessary for there to be an absence of a 121 KHz carrier frequency signal on the power line for at least three complete AC line cycles before the lack of intelligence on the line can be presumed. Accordingly, the microprocessor 80 is programmed to interrogate the line for three complete AC line cycles of "quiet time" before transmission of a PLC message is commenced. In addition, the microprocessor 80 is also programmed to interrogate the AC line for both the presence of intelligence and/or excessive noise during the transmission of a PLC message as well. In particular, it will be recalled from the description of FIG. 2 that the 121 KHz carrier frequency occurs only during one half of any given cycle of the 60 Hz AC waveform to produce a coded binary "1" or "0". Accordingly, the microprocessor 80 is programmed to interrogate the power line for the presence of intelligence and/or excessive noise during this "unused" half cycle of the AC waveform when transmitting a PLC message.

Figure 11:
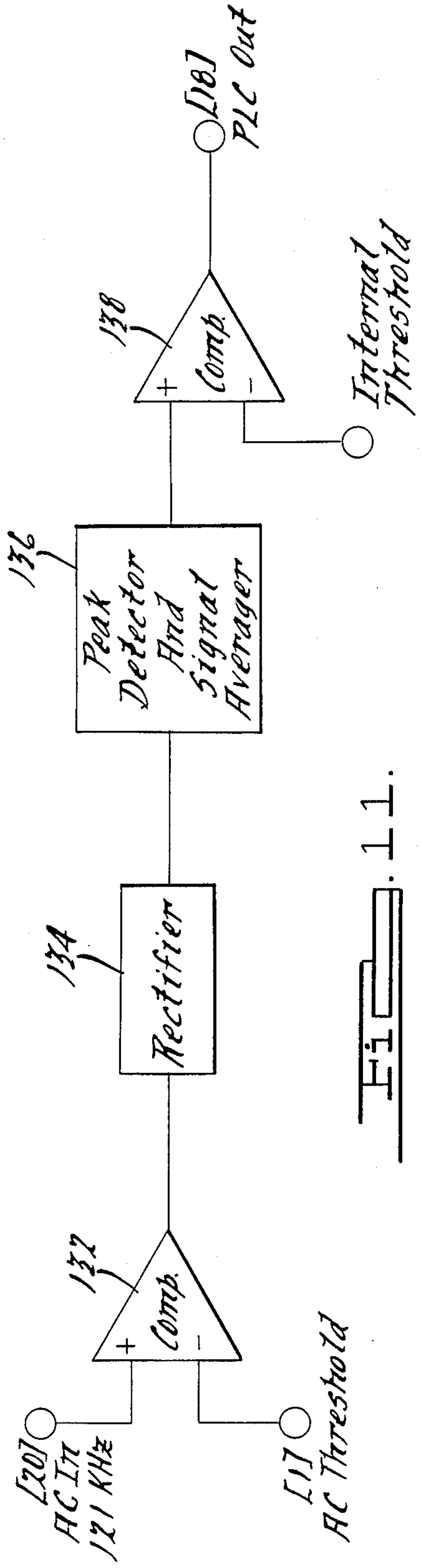
FIG. 11 is a block diagram of the PLC receiver portion of the custom integrated circuit of the relay module and controller illustrated in FIGS. 7 and 12, respectively.

In the preferred embodiment of the present system, the interrogation of the power line for the presence of intelligence or unacceptable noise levels is accomplished in the following manner. The custom integrated circuit 70 in the relay module 18 also includes a PLC receiver circuit for this purpose, even though the relay module is only adapted to transmit PLC signals. The signal off the power line from the coupling transformer 128 is provided to the PLC IN input (pin 20) of the custom IC 70 through a bandpass filter circuit 130 having a center frequency corresponding to the PLC carrier frequency of 121 KHz. With additional reference to FIG. 11, a block diagram of the PLC receiver circuit in the custom IC 70 is shown. The filtered AC input signal is provided to a threshold comparator circuit 132 which compares the incoming signal to an externally established threshold supplied to pin 1 of the custom IC 70. The output signal from comparator 132 is rectified by rectifier 134 and provided to a peak detector and signal averager circuit 136 which produces a DC level signal at its output. The DC output signal from circuit 136 is then provided through a second comparator circuit 138 having an internally established threshold before passing to the PLC OUT (pin 18) terminal of the custom IC 70.

The microprocessor 80 is programmed to detect the presence of intelligence or excessive noise on the AC power line by examining the signal supplied from the output of the PLC receiver circuit at pin 18 of the custom IC 70. In particular, the microprocessor 80 in the preferred embodiment is programmed to sample the PLC OUT line signal at approximately a 150 microsecond sample rate. If a continuous signal of more than 400 microseconds in duration is detected, the presence of intelligence is presumed and the microprocessor 80 will "standoff" (i.e., wait). In addition, the microprocessor 80 is programmed to count the number of noise spikes detected over a predetermined time period in the output signal from the PLC receiver circuit at pin 18 of the custom IC 70, and if the count total exceeds a predetermined number, to standoff as in the case of an intelligence "collision". In either event, when the presence of intelligence or excessive noise has been detected, the microprocessor 80 is programmed to execute a time delay of random duration before transmission is again attempted. In view of the duration of the CONTROLLER COMMAND and CONTROLLER STATE MESSAGES (FIGS. 4A and 4C)—the longest PLC message formats used in the system—the random delay period in the preferred embodiment is selected to be between 400 milliseconds and 2 seconds. (Note, that the CONTROLLER STATE MESSAGE illustrated in FIG. 4C is transmitted in two parts so that the required random standoff delay period is not excessively long.) All of the relay modules 18 and controllers 20 in the system are programmed to function in the same manner in this respect. Accordingly, by having each device in a potential collision situation execute a random time delay, the priority conflict over access to the AC power line is resolved in an arbitrary manner. Thus, the likelihood of two devices creating a perpetual standoff condition is avoided.

Lastly, the relay module 18 in the preferred embodiment includes an LED 139 (FIG. 7) that is connected to the 01 output port of the microprocessor 80. The microprocessor 80 is programmed to energize the LED 139 for 30 milliseconds when a valid coded audio intrusion signal has been received, and flash the LED 139 at a rapid rate whenever the voltage level of the battery 54 falls below a predetermined minimum (assuming, of course, that AC power is present).

CONTROLLER (20)

Figure 12:
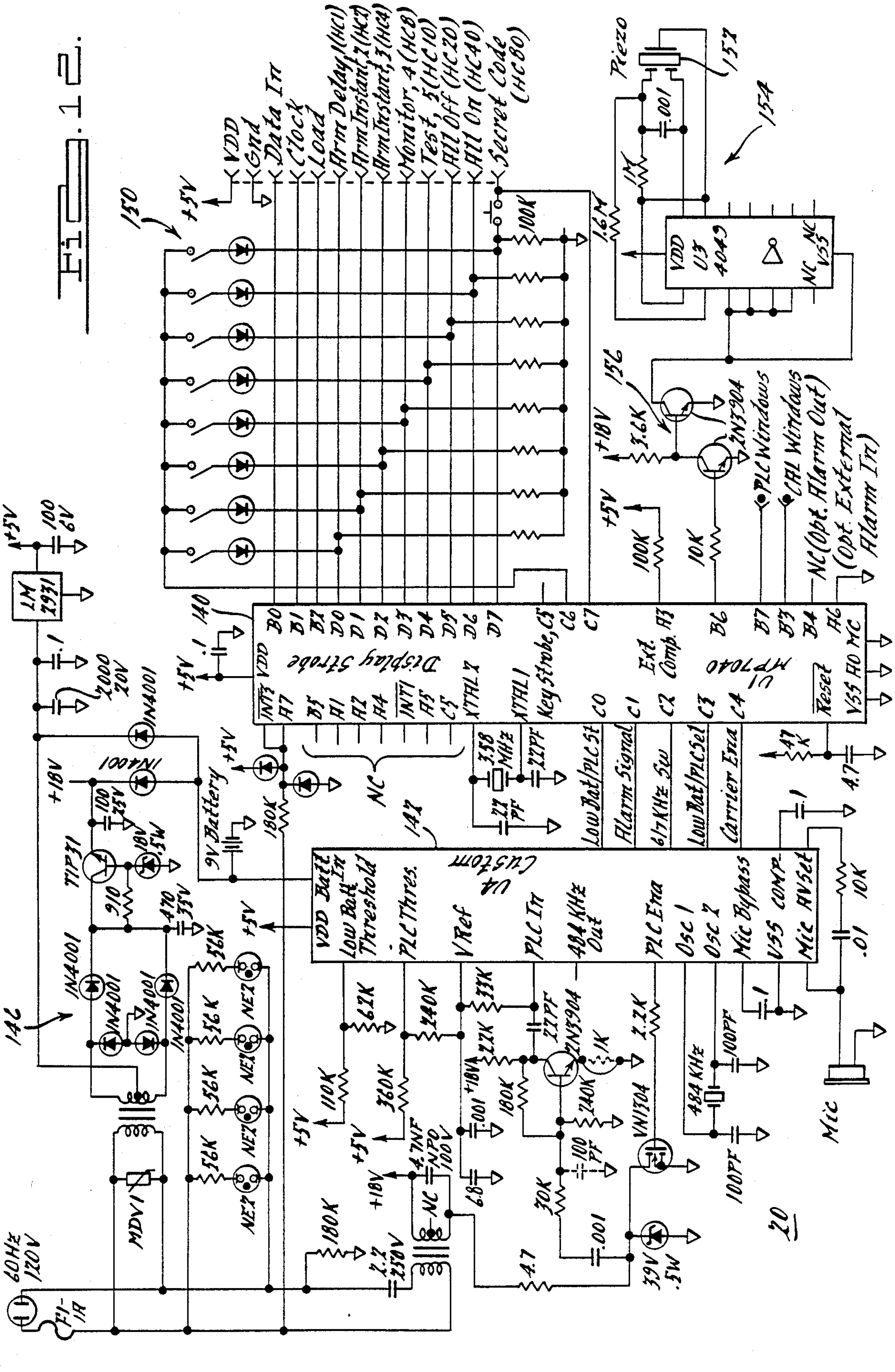
FIG. 12 is a circuit diagram of a portion of the controller.

Referring now to FIG. 12, a partial circuit diagram of the controller 20 according to the present invention is shown. The controller 20 comprises the primary interface between the system 10 and the user. The controller 20 in the preferred embodiment includes an LCD display for displaying system status information and for labeling the five keys on the keyboard. The keyboard additionally includes dedicated keys for the ALL LIGHTS ON, ALL LIGHTS OFF, and SECRET CODE functions. As will be recalled from the system description above, the controller 20 is adapted to receive PLC coded messages from the relay modules 18, or coded audio intrusion event signals directly from an entry detector 12, and in response thereto transmit PLC coded messages to the various slave modules 22 in the system. In addition, the controller 20 is adapted to receive PLC messages from other controllers in the system indicating the major state status of the other system controllers, the entry of a new secret code, or other information (e.g., parity check) which may be communicated to the controllers. In the preferred embodiment, the major state status of a controller is communicated over the power lines every 15 minutes and at each major state change to insure that all controllers in the system are always in the same state. The major states in the present system which are communicated over the power lines comprise the non-transitory states associated with the security mode of operation of the controller and include INSTANT-ARM, ARM-DELAY, and DISARM.

The various states of the system controller in the preferred embodiment are summarized below.

(a) DISARM STATE. The DISARM state comprises one of the three major security states of the controller and is the state to which most non-security related states connect.

(b) TEST STATE. The TEST state is used to perform a complete test of the installed security system. When in this state, the controller will transmit a PLC coded ALARM message to the various slave modules, followed two seconds later by a DISARM message. In addition, the user can test operate all of the entry detectors 12 in the system by manually activating the entry detectors and the controller will transmit an ALL LIGHTS ON message followed two seconds later by the ALL LIGHTS OFF message. In addition, the controller will activate its internal alarm during this two-second period.

(c) ALL LIGHTS ON. This is a transitory state which issues the PLC command message ALL LIGHTS ON.

(d) ALL LIGHTS OFF. This is a transitory state which issues the PLC command message ALL LIGHTS OFF.

(e) PANIC ALARM. This is a transitory state which issues the PLC command message ALARM, and is entered, regardless of the current state of the system, by simultaneously holding down the ALL LIGHTS ON and ALL LIGHTS OFF buttons for longer than one-half second. Once entered, the PANIC ALARM state behaves exactly like an intrusion alarm and can be exited either by inputting the secret code or by waiting out the 15-minute alarm timer.

(f) IN ERROR. This is a transitory state which informs the user of an incorrectly entered number during a disarm code input or a new secret code input. This state issues a 100 millisecond low volume beep on the controller's internal alarm and blanks the display for one-half second.

(g) POWER APPLIED. This is the state entered when power is initially applied to the controller either from connecting a battery or plugging the controller into an AC outlet. This state stores 11111 as the secret code and flashes all the display segments on and off until the secret code button is pushed and a new secret code entered.

(h) SECRET CODE INPUT. This state is entered whenever the secret code button is pushed and the system is in the DISARM, TEST, or POWER APPLIED states. The button must be held down for the entire operation of inputting the five numbers in the secret code. Upon release of the button, the secret code is automatically stored.

(i) INSTANT-ARM. This state comprises one of the three major system states. In this state, the receipt of either a coded audio signal from an entry detector or a PLC relay alarm signal results in an immediate transition to the ALARM ACTION state. The INSTANT-ARM state can only be entered by depressing the INSTANT-ARM button for at least 0.75 seconds, or by receipt of an INSTANT-ARM state message over the power lines from another controller. In addition, this button will only be labeled INSTANT-ARM on the display when the controller is in the DISARM state. Accordingly, this state can only be entered from the DISARM state and can only be exited from by inputting the correct secret code.

(j) ALARM ACTION. This state comprises the principal state for executing a system-wide alarm. Assuming the system is in an armed state, this state can be entered following receipt of a coded audio signal from an entry detector or a PLC alarm message from a relay module. In addition, this state can also be entered by the simultaneous actuation of the ALL LIGHTS ON and ALL LIGHTS OFF switches. This state is active during the entire 15-minute alarm period and can only be terminated prior to the 15-minute time-out by correct entry of the secret code.

(k) ALARM TIME-OUT. This state is an extension of the previous ALARM ACTION state and represents the actions taken when the 15-minute alarm timer times out.

(l) DISARM CODE INPUT. This state is entered when the display labels the keys with numbers and a number button is pushed. The five-digit secret code is entered and compared with the stored code. Or, if the secret code button is also depressed and the controller is in either the DISARM, TEST, or POWER APPLIED states, the five-digit number entered is stored as the new secret code.

(m) ARM-DELAY. This state comprises one of the three major controller states. The ARM-DELAY state can only be entered from the ARM ENABLE state. This state is exited upon receipt of a PLC relay alarm message or a coded audio alarm signal from an entry detector, or by inputting the correct secret code.

(n) COUNTDOWN DELAY. This state represents the 40-second counter which counts down from the receipt of an intrusion message to the ALARM ACTION state. This countdown state is also responsible for controlling the 40-second countdown indicator in the display and for transmitting the PLC COUNTDOWN message to the slave modules.

(o) ARM ENABLE. This state is entered by receipt of an ARM-DELAY state message over the power lines from another controller or by depressing the ARMED DELAY button for at least 0.75 seconds, and represents the transition state between the major controller states of DISARM and ARMED DELAY. The controller will complete the transition to the ARM-DELAY state after the ARM ENABLE state is entered upon either the elapse of 40 seconds after the detection of an exit event from the protected premises or after two minutes has elapsed without an exit event from the time the ARM DELAY button is depressed. The secret code can be entered during this time to abort this state and return the controller to the DISARM state.

(p) LOW BATTERY RELAY. This is a transitory state which is entered when a LOW BATTERY PLC message is received from a relay module in the system indicating that the relay module has a low battery condition. The only action taken by this state is to turn on the "low battery relay" flag in the controller display and to start the low battery time-out counter. In order for this low battery flag to stay set in the controller display, a LOW BATTERY PLC relay message must be received continuously between 3- and 16-minute intervals, otherwise the flag is reset.

(q) LOW BATTERY CONTROLLER. This is a transitory state entered when a test of the controller battery indicates that a controller low battery condition exists. The only action taken by this state is to turn on the "low battery controller" flag in the controller display.

Returning to the circuit diagram in FIG. 12, the controller 20 comprises in general a power supply 146, the same custom integrated circuit 142 used in the relay module 18, and an 8-bit microprocessor. In addition, the controller includes a display board (not shown) which contains a conventional LCD display driver and the various switch contacts for the buttons appearing on the keyboard panel of the controller. The microprocessor 140 controls the LCD display driver on the display board via output ports B0–B2 and is connected to the various switch contacts on the display board via input ports D0–D7. The input ports D0–D7 of the microprocessor 140 are also connected to two rotary thumb switches 150 located on the bottom panel of the controller for setting the system house code.

The function and operation of the custom integrated circuit 142, including the interface circuitry between the custom IC and the 120 volt–60 Hz AC line, is identical to that contained in the relay module 18. Accordingly, the controller 20 receives information off the AC power line and transmits information onto the AC power line in the same manner as the relay module 18. Of course, whereas the controller 20 decodes and interprets received PLC messages, the relay module 18 merely identifies the presence of PLC messages on the line for anti-collision purposes. And, as previously noted, the microprocessor 140 in the controller is programmed to monitor the AC line both before and during a PLC message transmission for the presence of intelligence or excessive noise levels and "standoff" for a random delay period of either condition is detected. As an additional means of avoiding potential collisions in a system employing multiple controllers, the microprocessor 140 in the controller 20 is further programmed to automatically execute a random delay of between 0–400 milliseconds following receipt of a RELAY ALARM message before transmitting the appropriate PLC controller message to the slave modules.

As in the relay module, the controller is also provided with a portable battery backup power source 148 so that the controller can continue to function in the event of a loss of primary AC power. In addition, the controller 20 includes an internal audio indicator, piezoelectric transducer 152, driven by a 3 KHz oscillator circuit 154 that is in turn enabled by a control signal from the B6 output port of the microprocessor 140 supplied to the oscillator circuit 154 via switching transistors 156. The microprocessor 140 is programmed to activate its internal alarm 152 immediately upon receipt of a RELAY ALARM PLC signal or an audio intrusion signal when the controller is in the INSTANT-ARM mode, and after executing a 40-second delay when in the ARM-DELAY mode. To insure adequate sound pressure levels (e.g., at least 85 db) from the transducer 152, the preferred embodiment additionally employs a mechanical sounding plate located an appropriate distance from the piezoelectric transducer 152 so that sound waves emanating therefrom reflect off the sounding plate without sound diminishing phase cancellation.

SLAVE MODULE (22–26)

Figure 13:
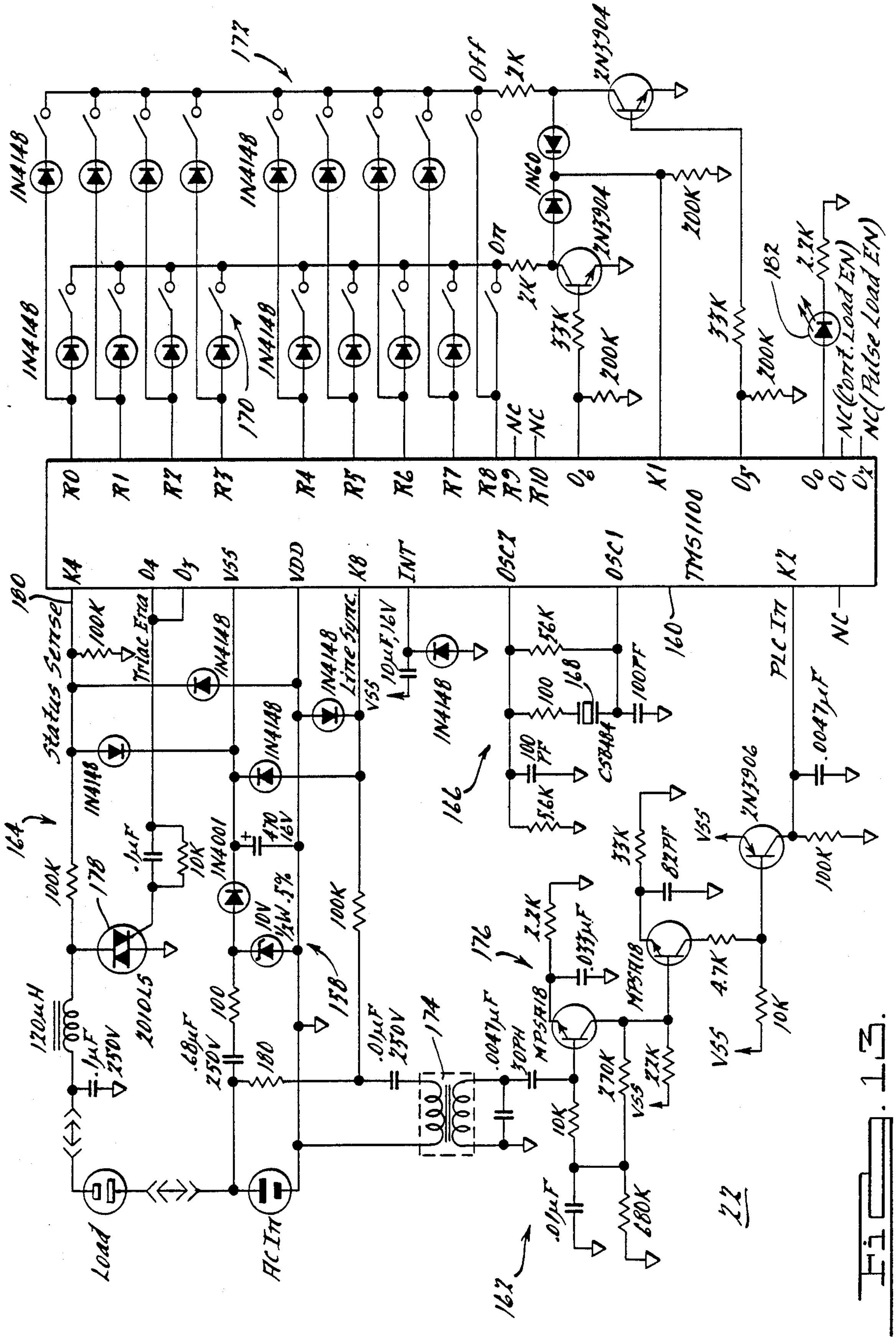
FIG. 13 is a circuit diagram of a lamp driver slave module.

Referring now to FIG. 13, a circuit diagram of a lamp module 22 according to the present invention is shown. The slave modules 22, 24, and 26, it will be recalled, are adapted to receive PLC command signals from the controller 20 and control the activation of their respective loads in accordance therewith. It will be appreciated, however, that the appliance and alarm modules 24 and 26, respectively, are substantially equivalent in function and configuration to the lamp module 22, with the differences therebetween being related to the characteristics of the particular load being controlled. In addition, the alarm module includes a battery backup power source so that the audio alarm will still sound in the event of an intrusion despite a loss of primary AC power. The lamp and appliance modules, on the other hand, are not provided with a battery backup.

The lamp module 22 in the preferred embodiment comprises in general a power supply 158, a 4-bit microprocessor 160, a PLC input circuit 162 for interfacing the microprocessor 160 to the AC line, and an output circuit 164 for controlling the activation of the load in response to a control signal from the microprocessor 160. An oscillator circuit 166 including a crystal oscillator 168 is connected to the OSC1 and OSC2 inputs of the microprocessor 160 to provide the internal clock timing for the microprocessor. A first set of eight switches is connected to the R0–R7 data inputs of the microprocessor and set to the house code for the system. A second set of eight switches is also connected to the R0–R7 data inputs of the microprocessor and establish the unit code of the slave module.

The PLC input circuit includes a coupling transformer that is connected across the AC line. The output from the coupling transformer 174 is provided to a 121 KHz bandpass filter and amplifier circuit 176 which in turn supplies the PLC IN signal to the K2 input port of the microprocessor 160. The output circuit 164 includes a TRIAC 178 that is connected in series with the load across the AC power lines to control the energization of the load. The conductive state of the TRIAC 178 is controlled by the microprocessor 160 which has its 03 and 04 output ports connected to the gate of the TRIAC. The microprocessor is programmed to decode and interpret the received PLC messages and generate an output signal at output ports 03 and 04 when appropriate to enable the TRIAC 178 to activate the load. In particular, the microprocessor 160 will enable the TRIAC 178 to energize the load in response to the receipt of a CONTROLLER COMMAND MESSAGE (FIG. 4A), provided the transmitted house code and unit code correspond to the preset house code and unit code of the lamp slave module 22. The microprocessor 160 will similarly enable/disable the TRIAC 178 in response to the receipt of an ALL LAMPS ON/OFF, respectively, controller command message (FIG. 4B), provided the message includes the proper house code. In response to the receipt of a CONTROLLER ALARM COMMAND MESSAGE (FIG. 4C) with the proper house code, the microprocessor 160 will immediately enable the TRIAC 178 to energize the load. In response to the receipt of a CONTROLLER COUNTDOWN COMMAND MESSAGE (FIG. 4C) with the proper house code, the microprocessor 160 will initiate a 40-second time delay before enabling the TRIAC 178. Lastly, upon receipt of a CONTROLLER DISARM COMMAND MESSAGE (FIG. 4C) with the proper house code, the microprocessor 160 will abort the 40-second time delay if in progress and disable the TRIAC 178 to de-activate the load.

It is considered well within the skill of those versed in the art to alternatively program the controller 20 and configure the slave module 26 to implement the independent slave timing feature of the present invention in an equivalent manner by modifying the slave module 26 to be presettable to either an INSTANT-ARM or ARM-DELAY state in response to the INSTANT-ARM and ARM-DELAY command messages transmitted by the controller 20 when it is initially placed in either of these armed states. When configured in this manner, only a single controller ALARM COMMAND message is required as the response of the slave module 26 is then determined by the state to which it has previously been set by the controller 20.

In addition, it will be noted that the microprocessor 160 in the preferred embodiment of the lamp slave module 22 includes a STATUS SENSE line 180 that is connected to the lamp to sense the ON/OFF condition of the manually operable switch associated with the lamp. In particular, in order to maintain local manual control of the lamp, the microprocessor 160 is programmed to respond to the pulse produced on the SENSE LINE 180 when the lamp switch is closed and enable the TRIAC 178 so that the lamp will turn on. Moreover, the STATUS SENSE line 180 is also used to permit remote control of the lamp without requiring that the lamp be continuously energized. Specifically, it will be appreciated that the microprocessor 160 cannot possibly turn the lamp ON unless the lamp switch is closed. However, it is obviously undesirable to require that the lamp be continuously ON in order to provide the remote control capability. Accordingly, the microprocessor 160 is programmed to detect the sequential ON-OFF-ON manual toggling of the lamp switch within a preselected brief time period and turn off the lamp after two seconds. In this manner, the lamp is placed in the OFF condition despite the closed position of the lamp switch, thus permitting remote control of the lamp via the lamp slave module 22. To thereafter manually turn on the lamp, it is necessary simply to toggle the lamp switch OFF-ON. An LED 182 connected to the Oo output port of the microprocessor 160 is energized by the microprocessor when the lamp has been placed in the remote control condition.

Finally, it should be noted that the relay modules 18, controller(s) 20, and alarm slave modules 26 in the present system are each provided with battery backup to supply auxiliary power to the devices in the event of a loss of primary AC power. In such event, the switch to battery power occurs automatically and the microprocessors in each unit are programmed to generate accurate timing signals from the internal quartz crystal and ceramic resonator oscillator circuits included in each unit to permit the units to asynchronously communicate over the power lines when primary AC power is absent. In this manner, the present security system cannot be defeated by interrupting AC power to the protected premises.

While the above description constitutes the preferred embodiment of the invention, it will be appreciated that the invention is susceptible to modification, variation, and change without departing from the proper scope of fair meaning of the accompanying claims.

What is claimed is:

1. A security system for detecting an intrusion into a protected premises having an AC power line and signaling the detection of the inrusion event, including:

one or more entry detectors operatively associated with a corresponding number of selected entryways to the protected premises for sensing an entry through said respective entryways and producing a coded audo signal in response thereto;

at least one signal relay device adapted to be electrically connected to the AC power line in the protected premises and located within the audio range of an entry detector, including audio receiver means for receiving said coded audio signal and separating said coded audio signal from extraneous noise in the received signal, PLC transmission means for impressing a coded relay signal onto said AC power line, and processor means for decoding said coded audio signal and enabling said PLC transmission means in said relay device to transmit said coded relay signal in response to the detection of a valid coded audio signal;

a controller adapted to be electrically connected to the AC power line of the protected premises, including PLC receiver means for receiving said coded relay signal and separating said coded relay signal from extraneous signals on said AC power line, PLC transmission means for impressing a coded controller signal onto said AC power line, and processor means for decoding said coded relay signal and enabling said PLC transmission means in said controller to transmit said coded controller signal in response to the detection of a valid coded relay signal; and at least one slave device adapted to be electrically connected between the AC power line and an alarm device for controlling the activation of said alarm device, including PLC receiver means for receiving said coded controller signal and separating said coded controller signal from extraneous signals on said AC power line, output means for activating said alarm device, and processor means for decoding said coded controller signal and enabling said output means to activate said alarm device in response to the detection of a valid coded controller signal.

2. The security system according to claim 1 wherein said controller means is selectively operable in either a first mode wherein a first coded controller signal is impressed onto said AC power line in response to the receipt and detection of a valid coded relay signal or a second mode wherein a second coded controller signal is impressed onto said AC power line in response to the receipt and detection of a valid coded relay signal.

3. The security system according to claim 2 wherein said processor means in said slave device is adapted to immediately enable said output means to activate said alarm device in response to the receipt and detection of said first coded controller signal and further adapted to enable said output means to activate said alarm device after a predetermined time delay following the receipt and detection of said second coded controller signal.

4. The security system according to claim 1 wherein said processor means in said controller is adapted to determine if other coded signals are being transmitted over said AC power line before enabling said PLC transmission means in said controller to transmit said coded controller signal.

5. The security system according to claim 4 wherein said processor means in said controller is further adapted to wait a random period of time following a determination that other coded signals are present on said AC power line before again attempting transmission of said coded controller signal.

6. The security system according to claim 4 wherein said processor means in said controller is further adapted to determine if noise levels in excess of a predetermined amount are present on said AC power line before enabling said PLC transmission means in said controller to transmit said coded controller signal.

7. The security system according to claim 6 wherein said processor means in said controller is further adapted to wait a random period of time before again attempting transmission of said coded controller signal following a determination of the presence on said AC power line of either other coded signals or noise levels in excess of said predetermined amount.

8. The security system according to claim 4 wherein said AC power line contains an alternating current signal having zero-crossing points in its waveform and said relay coded signal and said controller coded signal comprise predetermined carrier frequency signals that are digitally pulse code modulated relative to the zero-crossing points in the AC power line waveform such that one complete cycle of the AC power line waveform is used to transmit each bit of information in said coded signals.

9. The security system according to claim 8 wherein said pulse code modulated carrier frequency signal is representative of a digital "1" when a carrier frequency pulse is generated during the positive (negative) half cycle of the AC power line waveform and a digital "0" when a carrier frequency pulse is generated during the negative (positive) half cycle of the AC power line waveform.

10. The security system according to claim 9 wherein said processor means in said controller is further adapted to determine if other pulse code modulated carrier frequency signals are being transmitted over said AC power line during the transmission of a controller coded signal by looking for the presence of said carrier frequency on said AC power line during the unused half cycle of the AC power line waveform.

11. The security system acccording to claim 1 wherein said coded audio signal has at least one predetermined frequency associated therewith and said audio receiver means in said signal relay device includes a receiver comprising a broadband bandpass filter circuit, a limiter circuit connected to the output of said broadband bandpass filter circuit, and a narrow bandpass filter circuit connected to the output of said limiter circuit and having a center frequency approximately equal to said predetermined frequency.

12. The security system according to claim 11 wherein said coded audio signal comprises alternating predetermined first and second frequency tones having predetermined spacing between successive alternating tones.

13. The security system according to claim 12 wherein said receiver includes first and second narrow bandpass filter circuits connected to the output of said limiter circuit and having center frequencies approximately equal to said first and second predetermined frequencies, respectively.

14. The security system according to claim 13 wherein said audio receiver means further includes decoding means for decoding said coded audio signal, comprising logic circuit means for detecting in corresponding alternating sequence the presence of said first predetermined frequency tone and the simultaneous absence of said second predetermined frequency tone followed by the presence of said second predetermined frequency tone and the simultaneous absence of said first predetermined frequency tone.

15. The security system according to claim 14 wherein said first and second predetermined frequencies are approximately equal to 6 KHz and 7.3 KHz, respectively.

16. A security system for detecting an intrusion into a protected premises and signaling the detection of the intrusion event, including:

intrusion detection means for detecting an intrusion into the protected premises and producing a coded signal in response thereto;

controller means for receiving said coded signal from said intrusion detection means and producing alarm signals in response thereto, said controller means being selectively operable in either a first mode wherein a first alarm signal is produced in response to the receipt of a coded signal from said intrusion detection means, or a second mode wherein a second alarm signal is produced in response to the receipt of a coded signal from said intrusion detection means; and slave means located remotely from said controller means and connected to an alarm device for controlling the activation of said alarm device, said slave means being responsive to the receipt of said first alarm signal from said controller means to immediately activate said alarm device and being responsive to the receipt of said second alarm signal from said controller means for implementing a predetermined time delay before activating said alarm device.

17. The security system according to claim 16 wherein said controller means is further adapted to produce a third signal and said slave means is responsive to the receipt of said third signal from said controller means for aborting the implementation of said predetermined time delay and preventing activation of said alarm device.

18. The security system according to claim 17 wherein said controller means further includes input means for permitting an operator to input information into said controller means, and said controller means is further adapted to produce said third signal solely in response to the entry of a secret code established by the operator into said controller means via said input means.

19. The security system according to claim 18 wherein said controller means is selectively operable in either of said first or second modes in response to predetermined entries made via said input means.

20. The security system according to claim 16 wherein said controller means is adapted to be electrically connected to the AC power line of the protected premises and further includes PLC transmission means for impressing said alarm signals onto said AC power line.

21. The security system according to claim 20 wherein said slave means is adapted to be electrically connected between said AC power line and said alarm device and further includes PLC receiver means for receiving said alarm signals transmitted over said AC power line from said controller means.

22. A security system for detecting an intrusion into a protected premises and signaling the detection of the intrusion event, including:

intrusion detection means for detecting an intrusion into the protected premises and producing a coded audio signal in response thereto, said coded audio signal having at least one predetermined frequency associated therewith; and a device for receiving and decoding said coded audio signal and producing an alarm signal in response thereto, said device including receiver means for separating said coded audio signal from the extraneous noise in the received signal, comprising a broadband bandpass filter circuit, a limiter circuit connected to the output of said broadband bandpass filter circuit, and a narrow bandpass filter circuit connected to the output of said limiter circuit and having a center frequency approximately equal to said predetermined frequency.

23. The security system according to claim 22 wherein said coded audio signal comprises alternating predetermined first and second frequency tones having predetermined spacing between successive alternating tones.

24. The security system according to claim 23 wherein said predetermined spacing is of sufficient duration to insure that the echoes from the transmission of said first (second) frequency tone will have diminished sufficiently by the time said second (first) frequency tone is transmitted so that said echo signals will be excluded by said receiver means when said second (first) frequency tone is received.

25. The security system according to claim 24 wherein said receiver means includes first and second narrow bandpass filter circuits connected to the output of said limiter circuit and having center frequencies approximately equal to said first and second predetermined frequencies, respectively.

26. The security system according to claim 25 wherein said device further includes decoding means for decoding said coded audio signal, comprising logic circuit means for detecting in corresponding alternating sequence the presence of said first predetermined frequency tone and the simultaneous absence of said second predetermined frequency tone followed by the presence of said second predetermined frequency tone and the simultaneous absence of said first predetermined frequency tone.

27. The security system according to claim 26 wherein said first and second predetermined frequencies are approximately equal to 6 KHz and 7.3 KHz, respectively.

28. The security system according to claim 22 wherein said device comprises a signal relay device that is adapted to be electrically connected to the AC power line in the protected premises and includes PLC transmission means for impressing said alarm signal onto said AC power line.

29. The security system according to claim 28 further including:

a controller adapted to be electrically connected to the AC power line of the protected premises, including PLC receiver means for receiving said alarm signal from said signal relay device, PLC transmission means for impressing a controller signal onto said AC power line, and processer means for enabling said PLC transmission means in said controller to transmit said controller signal in response to the detection of said alarm signal; and at least one slave device adapted to be electrically connected between the AC power line and an alarm device for controlling the activation of said alarm device, including PLC receiver means for receiving said controller signal, output means for activating said alarm device, and processor means for enabling said output means to activate said alarm device in response to the detection of said controller signal.

30. The security system according to claim 29 wherein said processor means in said slave device is adapted to implement a predetermined time delay upon detection of said controller signal before enabling said output means to activate said alarm device.

31. In a security system including detection means for detecting an intrusion into a protected premises having an AC power line and producing an intrusion signal in response thereto, a signal relay device adapted to be electrically connected to the AC power line in the protected premises for impressing a coded relay signal onto said AC power line in response to the receipt of said intrusion signal, a controller adapted to be electrically connected to said AC power line for impressing a coded controller signal onto said AC power line in response to the receipt of said coded relay signal, and a slave device adapted to be electrically connected between said AC power line and an alarm device for activating said alarm device in response to the receipt of said coded controller signal, and wherein said coded relay signal and said coded controller signal comprise predetermined carrier frequency signals that are digitally pulse code modulated with one complete cycle of the AC power line waveform being used to transmit each bit of information in said coded signals with a digital "1" corresponding to a carrier frequency pulse being generated during the positive (negative) half cycle of the AC power line waveform and a digital "0" corresponding to a carrier frequency pulse being generated during to the negative (positive) half cycle of the AC power line waveform; the improvement comprising:

processor means in said signal relay device and processor means in said controller for determining if other coded signals are being transmitted over said AC power line both prior to and during the transmission of said coded relay and coded controller signals, respectively, and delaying or aborting said respective transmissions in the event other intelligence on said AC power line is detected.

32. The security system according to claim 31 wherein said processor means in said signal relay device and said controller are adapted to look for the presence of said predetermined carrier frequency on said AC power line both prior to transmission of said respective coded signals and during the unused half cycle of the AC power line waveform during the transmission of said respective coded signals.

33. The security system according to claim 32 wherein said processor means in said signal relay device and said controller are further adapted to wait a random period of time following a determination that other intelligence is present on said AC power line before again attempting transmission of said respective coded signals.

34. The security system according th claim 33 wherein said processor means in said signal relay device and in said controller are further adapted to determine if noise levels in excess of a predetermined amount are present on said AC power line both prior to and during transmission of said respective coded signals and delay or abort said respective transmissions in the event excessive noise levels on the AC power line are detected.

35. The security system according to claim 34 wherein said processor means in said signal relay device and in said controller are further adapted to wait said random period of time following the detection of excessive noise levels on said AC power line before again attempting transmission of said respective coded signals.

36. The security system according to claim 35 wherein said processor means in said signal relay device and said controller are adapted to look for the presence of excessive noise levels on the AC power line both prior to transmission of said respective coded signals and during the unused half cycle of the AC power line waveform during the transmission of said respective coded signals.

* * * * *